United States Patent
Yanai

(10) Patent No.: US 9,237,254 B2
(45) Date of Patent: Jan. 12, 2016

(54) IMAGE PROCESSING APPARATUS AND IMAGE PROCESSING METHOD FOR FORMING A HIGH-QUALITY IMAGE BY CONTROLLING SUPERIMPOSITION OF DOTS TO BE PRINTED IN MULTI-PASS PRINTING

(71) Applicant: CANON KABUSHIKI KAISHA, Tokyo (JP)

(72) Inventor: Tomokazu Yanai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 122 days.

(21) Appl. No.: 13/742,609

(22) Filed: Jan. 16, 2013

(65) Prior Publication Data

US 2013/0194593 A1  Aug. 1, 2013

(30) Foreign Application Priority Data

Jan. 27, 2012  (JP) .................................. 2012-015929

(51) Int. Cl.
*G06K 15/10* (2006.01)
*H04N 1/405* (2006.01)
*H04N 1/52* (2006.01)

(52) U.S. Cl.
CPC .......... *H04N 1/40018* (2013.01); *G06K 15/105* (2013.01); *H04N 1/52* (2013.01)

(58) Field of Classification Search
CPC .... H04N 1/40018; H04N 1/52; G06K 15/105
USPC .................. 358/1.13–1.18, 1.9–3.32
See application file for complete search history.

(56) References Cited

U.S. PATENT DOCUMENTS

| | | | |
|---|---|---|---|
| 7,031,025 B1 * | 4/2006 | He et al. ...................... | 358/3.09 |
| 2003/0214555 A1 * | 11/2003 | Teshigawara et al. ........... | 347/43 |
| 2007/0046961 A1 * | 3/2007 | Kashibuchi et al. ............ | 358/1.9 |
| 2007/0092151 A1 * | 4/2007 | Takahashi et al. ............. | 382/251 |
| 2009/0021784 A1 * | 1/2009 | Hoshii et al. ................. | 358/1.15 |
| 2013/0038907 A1 | 2/2013 | Yanai | |

FOREIGN PATENT DOCUMENTS

| | | |
|---|---|---|
| JP | 2008-67049 A | 3/2008 |
| JP | 2010-100017 A | 5/2010 |
| JP | 2013-038643 A | 2/2013 |

OTHER PUBLICATIONS

Japanese Office Action issued in corresponding application No. 2012-015929 dated Nov. 24, 2015—4 pages.

* cited by examiner

*Primary Examiner* — Marivelisse Santiago Cordero
*Assistant Examiner* — Kevin Ky
(74) *Attorney, Agent, or Firm* — Fitzpatrick, Cella, Harper & Scinto

(57) ABSTRACT

This invention generates a high-quality image by controlling the superimposition relationship between dots to be printed in multi-pass printing by a printhead including a plurality of printing elements. When a yellow dot is printed after printing a cyan dot in one scan in multi-pass printing, image data serving as a processing target is generated as follows. In cyan and yellow halftone image data for each scan, halftone image data having dots at a common pixel are set to correspond to a scan in which yellow dot data precedes cyan dot data. A yellow dot is printed as a layer lower than a cyan dot.

22 Claims, 36 Drawing Sheets

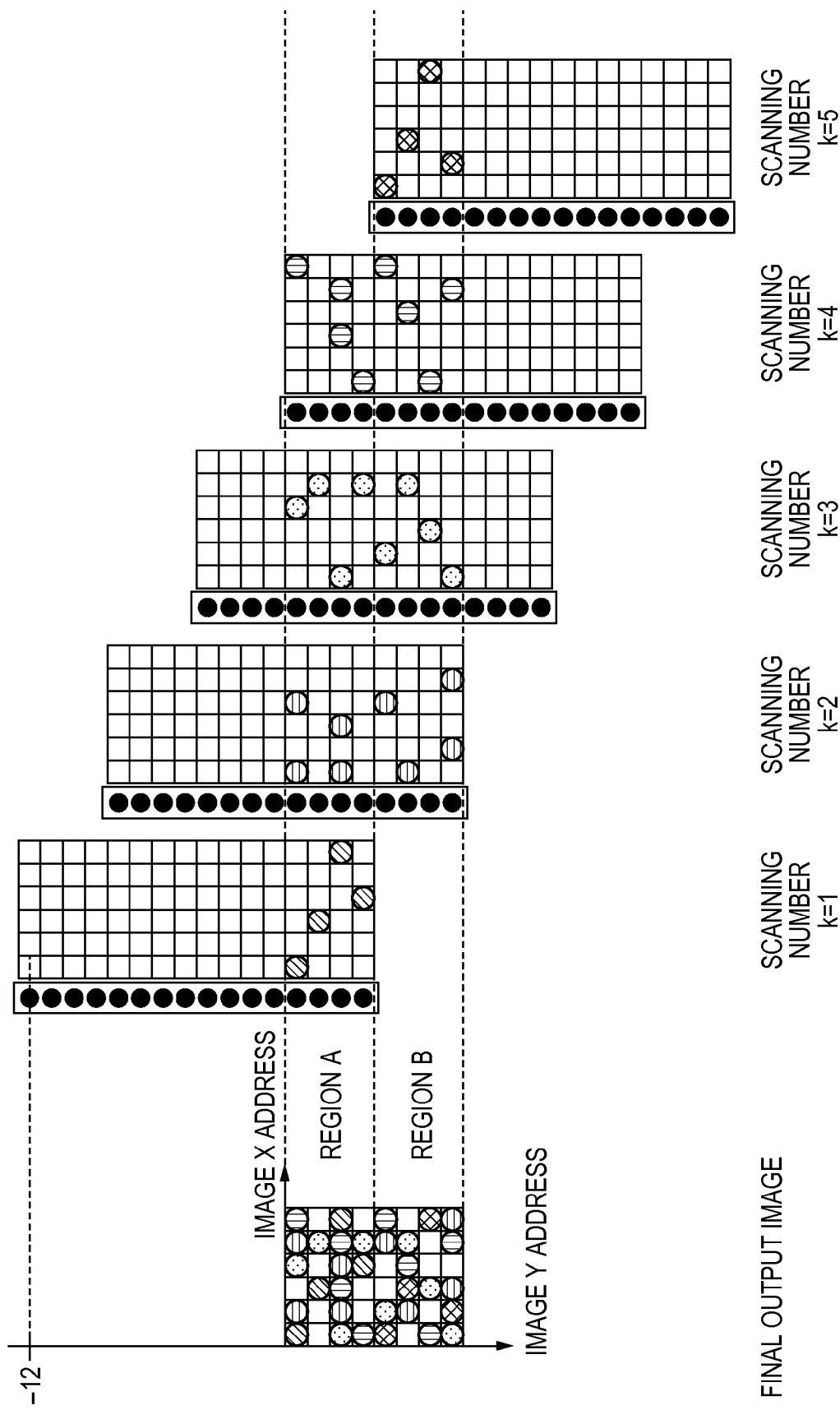

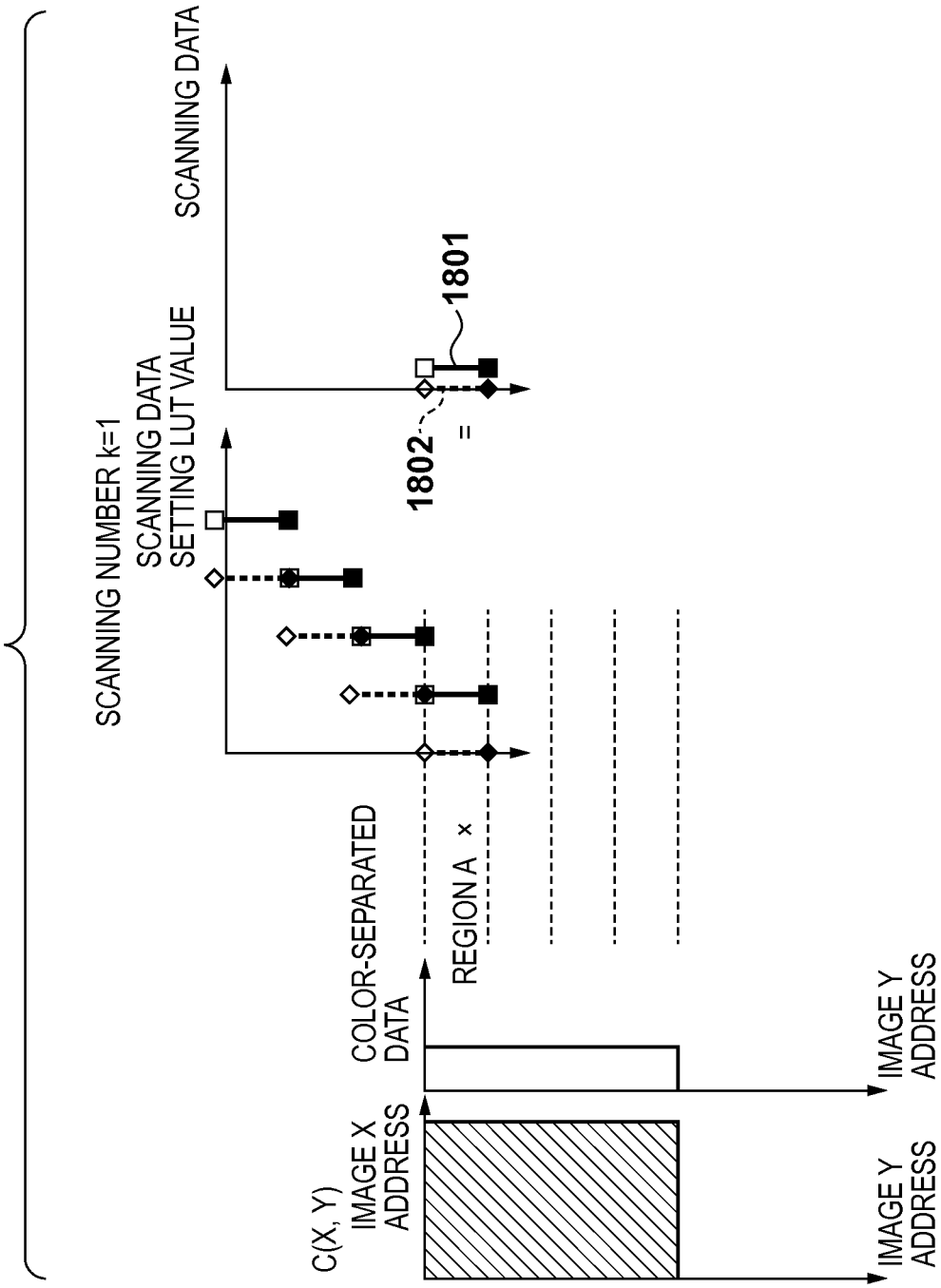

FIG. 5

| | |
|---|---|
| COVERING CONDITION 1 | 1401 |
| EXAMPLE) CYAN COVERAGE : 20%=51<br>YELLOW COVERAGE : 30%=76.5<br><br>CYAN COVERAGE+YELLOW COVERAGE<br>=51+76.5=127.5 | (YELLOW  CYAN 1404 1405)<br>PAPER SURFACE |
| COVERING CONDITION 2 | 1402 |
| EXAMPLE) CYAN COVERAGE : 60%=153<br>YELLOW COVERAGE : 70%=178.5<br><br>CYAN COVERAGE+YELLOW COVERAGE<br>=153+178.5=331.5 | Tmp1=38.25−0.0=38.25<br>Tmp2=76.5−44.625=31.875<br>Tmp3=114.75−89.25=25.5<br>Tmp4=153−133.875=19.125<br>255−Y_d=76.5<br>H1=76.5 |
| COVERING CONDITION 3 | 1403 |
| EXAMPLE) CYAN COVERAGE : 90%=229.5<br>YELLOW COVERAGE : 95%=242.25<br><br>CYAN COVERAGE+YELLOW COVERAGE<br>=229.5+242.25=471.75 | Tmp1=57.375−0.0=57.375<br>Tmp2=114.75−60.5625=54.1875<br>Tmp3=172.125−121.125=51<br>Tmp4=229.5−181.6875=47.8125<br>255−Y_d=12.75<br>H1=57.375 |

F I G. 6A
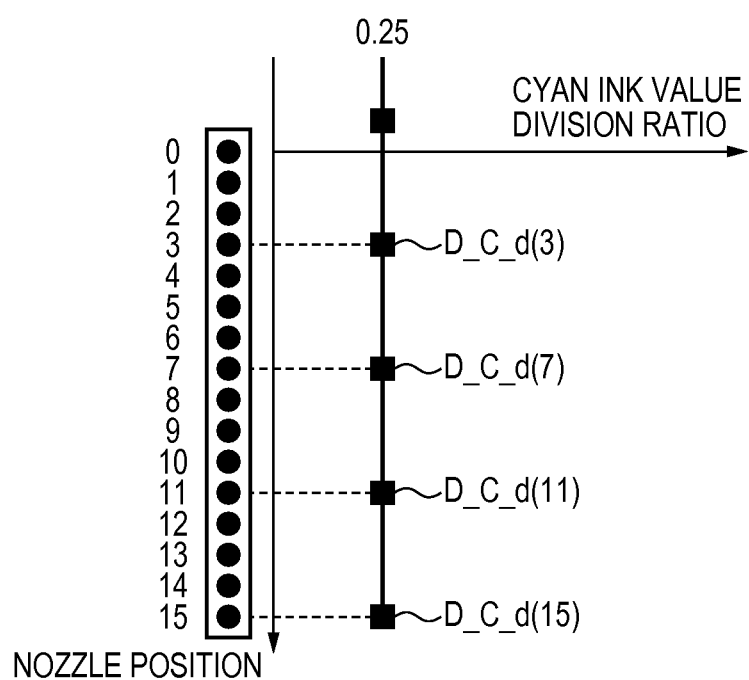

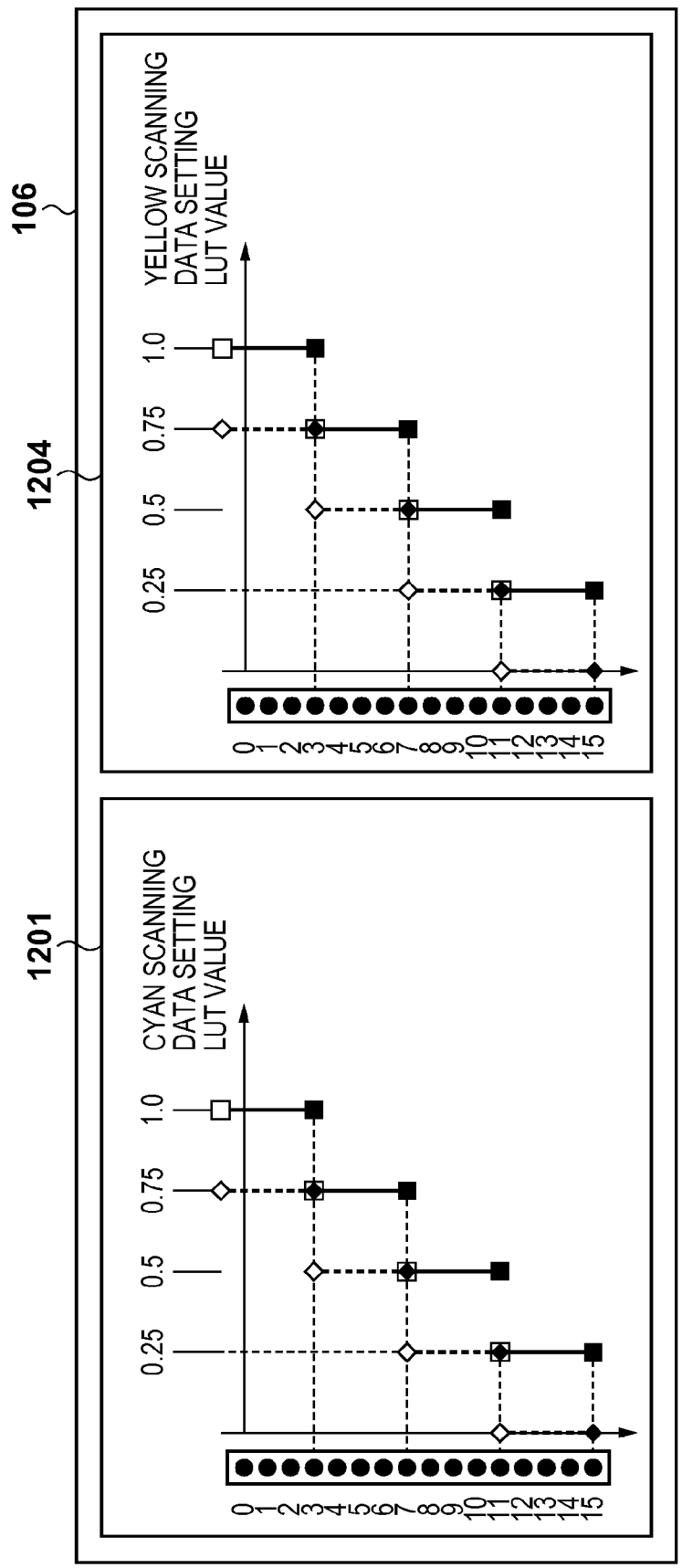

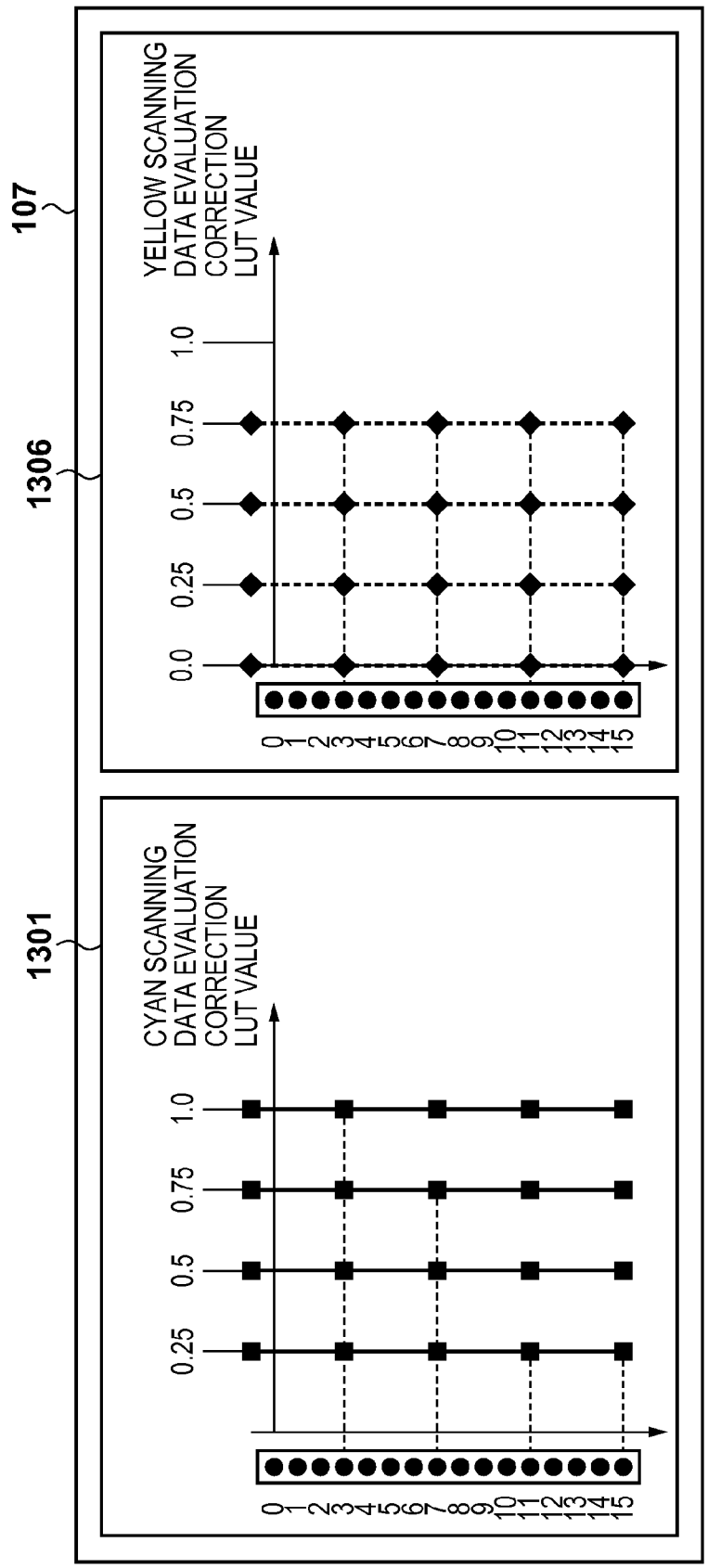

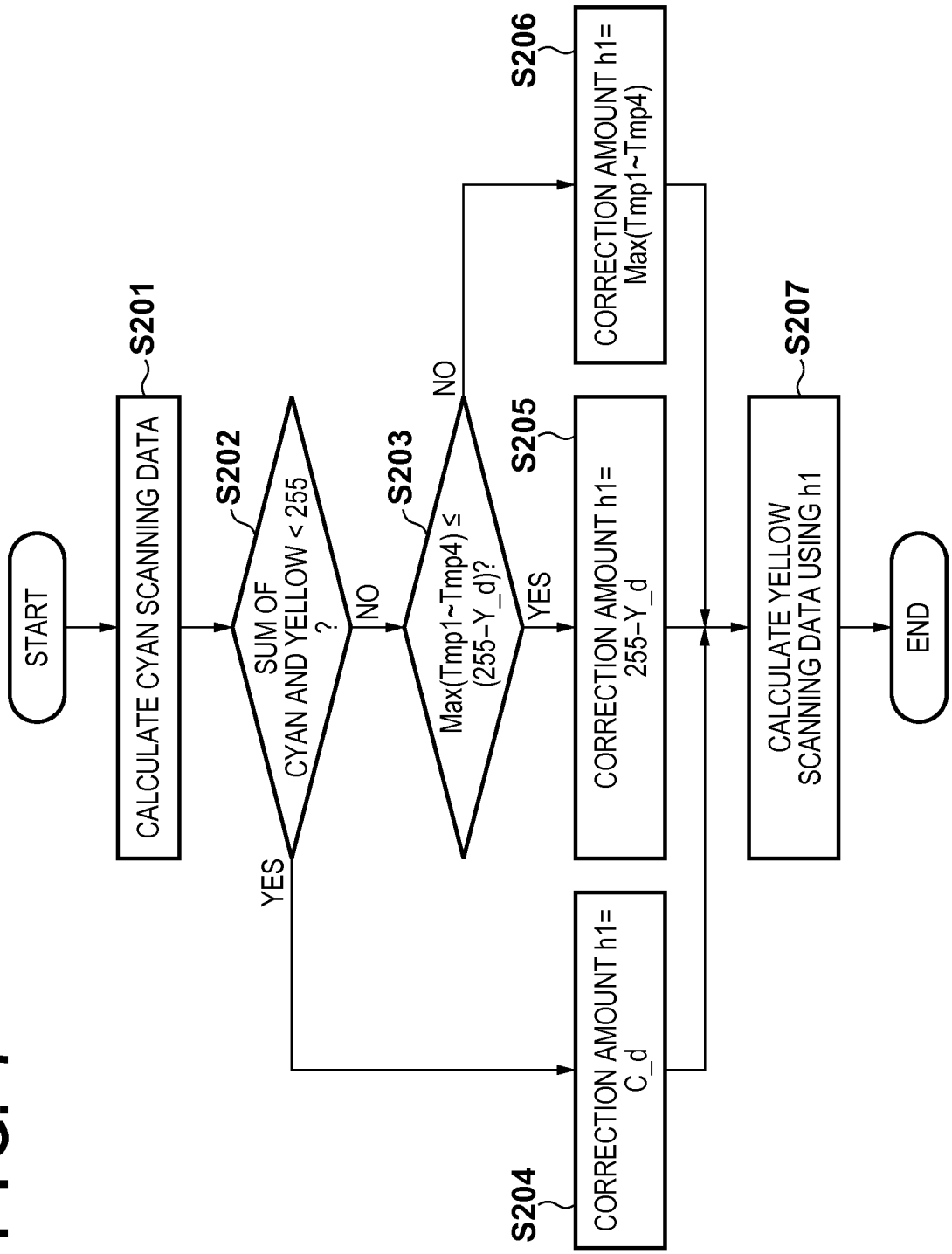

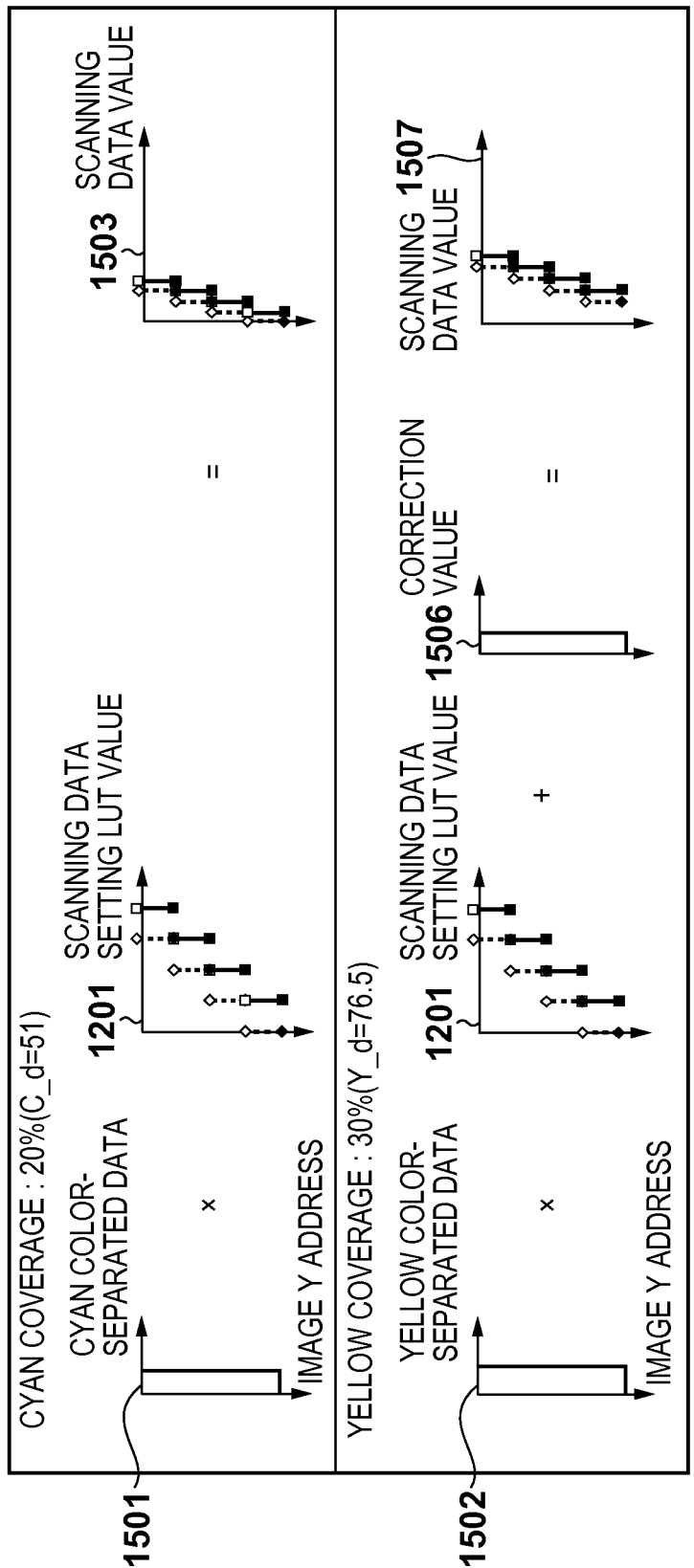

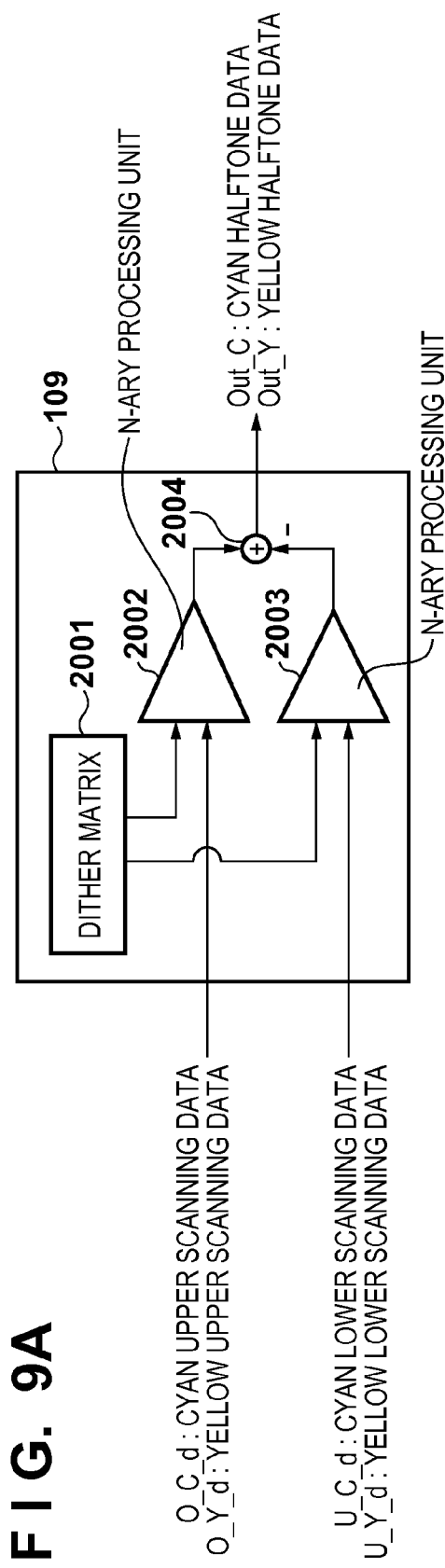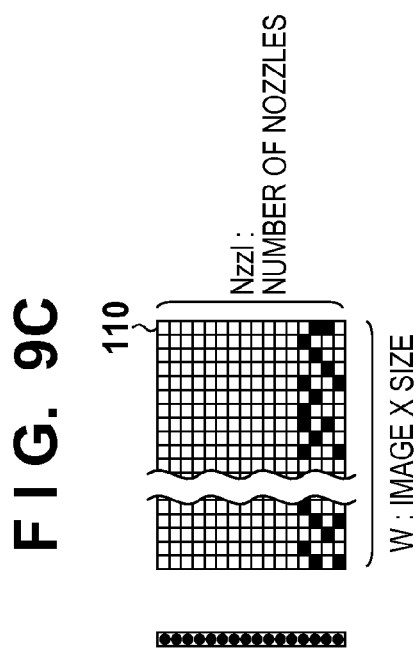
FIG. 9A
FIG. 9B
FIG. 9C

F I G. 15A
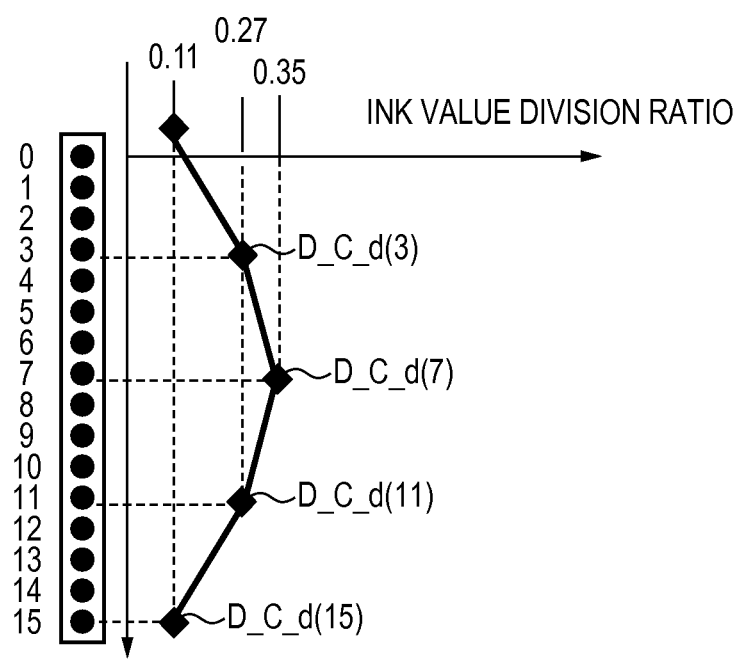

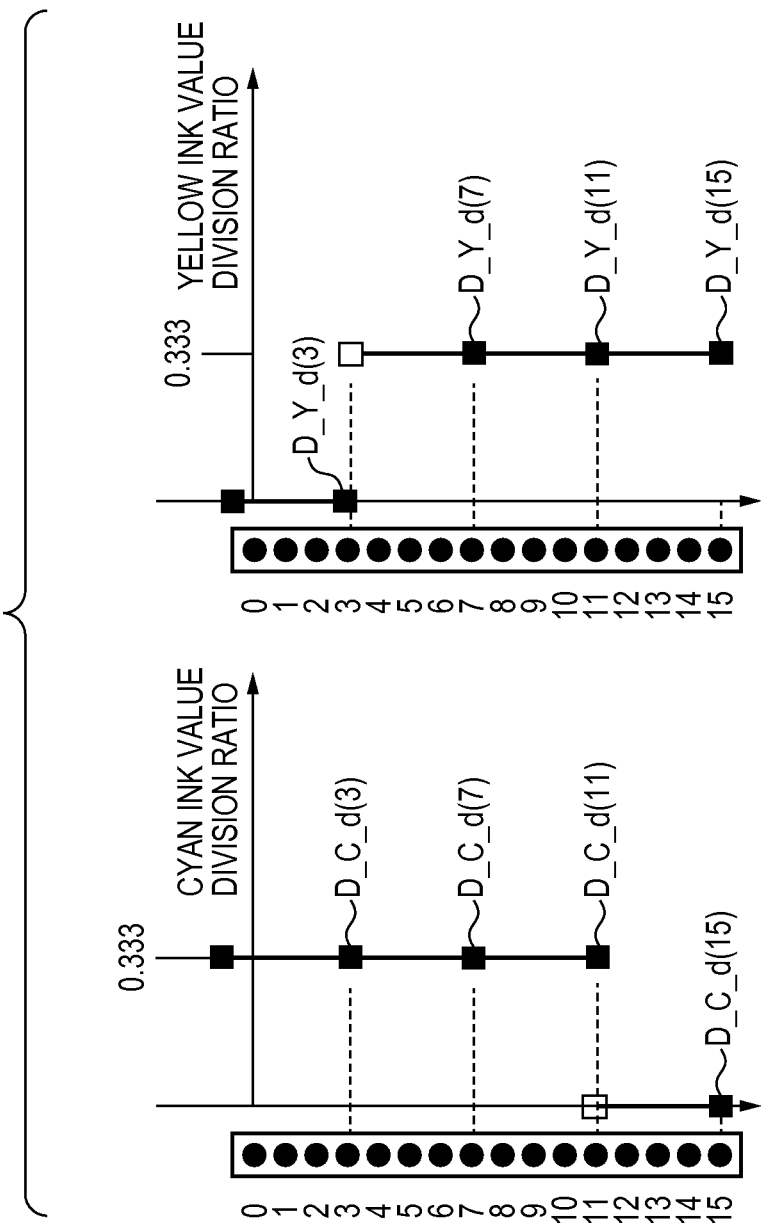

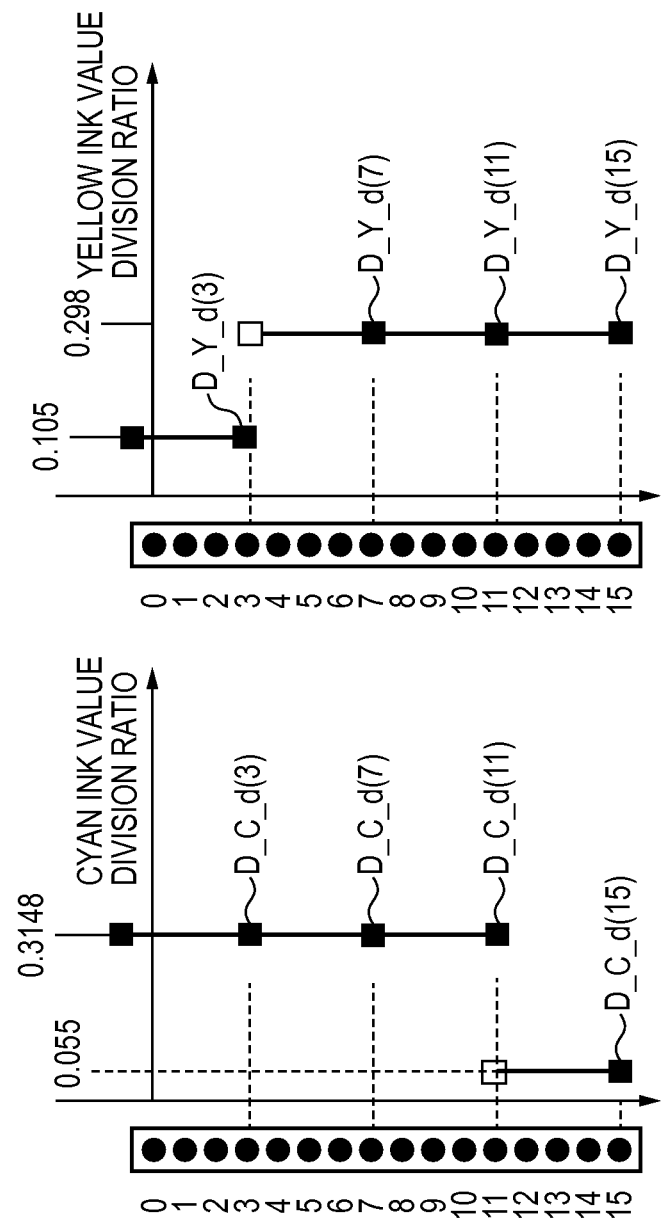

FIG. 18C
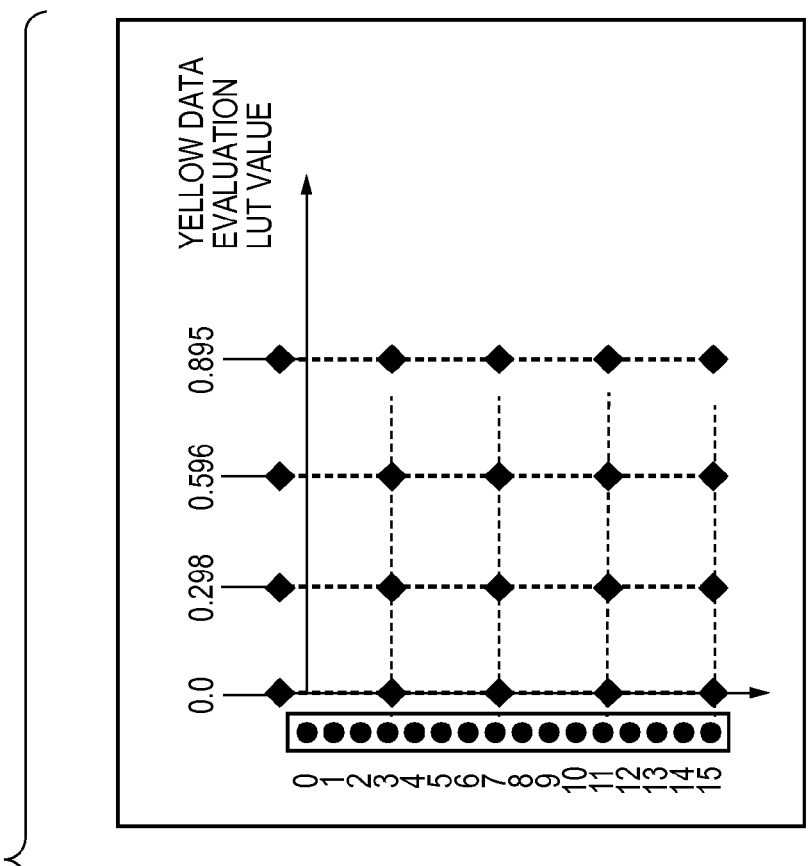
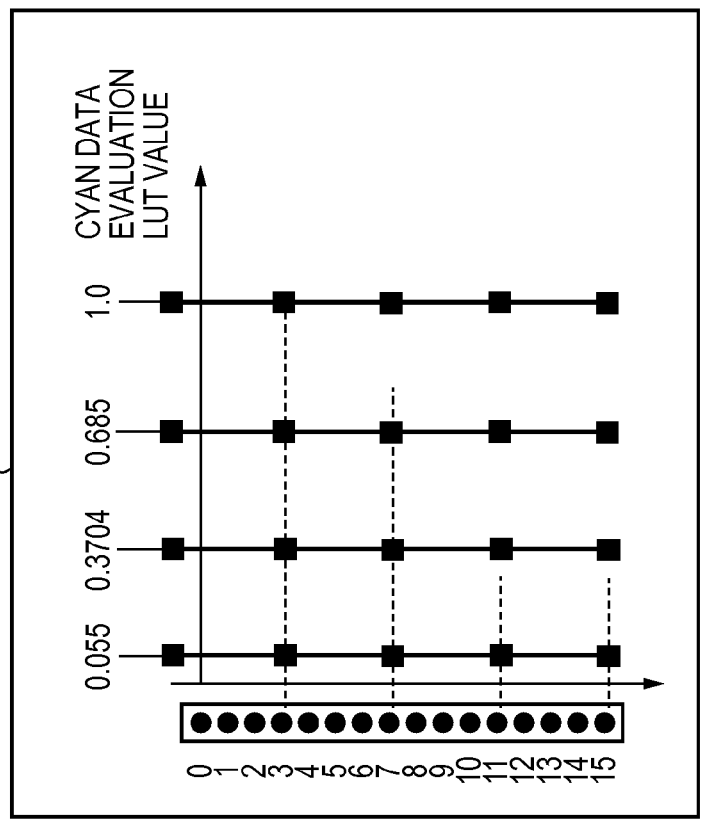

IMAGE PROCESSING APPARATUS AND IMAGE PROCESSING METHOD FOR FORMING A HIGH-QUALITY IMAGE BY CONTROLLING SUPERIMPOSITION OF DOTS TO BE PRINTED IN MULTI-PASS PRINTING

BACKGROUND OF THE INVENTION

1. Field of the Invention

The present invention relates to an image processing apparatus and image processing method for printing using a plurality of color materials.

2. Description of the Related Art

The following technique has been proposed to improve light resistance when both dye ink and pigment ink are used, and suppress color unevenness and gloss unevenness when pigment ink is used. The ink fixing order is controlled when, for example, so-called multi-pass printing is performed to form an image by printing a plurality of times in the same region on a printing medium (for example, Japanese Patent Laid-Open No. 2010-100017). That is, when both dye ink and pigment ink are used, it is controlled to always print the pigment ink higher in light resistance as an upper layer. When pigment inks of different colors are used, it is controlled to always print one color as an upper layer.

However, according to the ink fixing order control method disclosed in Japanese Patent Laid-Open No. 2010-100017, dots corresponding to each scan are thinned out in accordance with a given fixed pattern in multi-pass printing. This may impair the dispersibility of a dot pattern itself corresponding to each scan. Poor dispersibility of the dot pattern may locally disturb the once-controlled upper layer/lower layer relationship between inks owing to misregistration between printing scans and the interaction between inks.

SUMMARY OF THE INVENTION

The present invention generates a high-quality image by controlling the superimposition relationship between dots to be printed while maintaining the dispersibility of a dot pattern when forming an image by printing a plurality of times in the same region on a printing medium.

According to an aspect of the invention, where is provided an image processing apparatus which generates image data as a processing target by an image forming apparatus that forms an image by performing a plurality of times a scan in which, in a single region on a printing medium, a printhead including a plurality of printing elements prints in accordance with first image data corresponding to a first color component of an image, and prints in accordance with second image data corresponding to a second color component of the image, comprising: a setting unit configured to set first scanning data and second scanning data in each scan for the first image data and the second image data, respectively, by dividing, for respective scans, density ranges represented by pixel values of pixels forming the first image data and the second image data; and a generating unit configured to generate first halftone image data and second halftone image data in each scan based on the density ranges of the first scanning data and second scanning data, wherein dot patterns including dots at a pixel position common to a dot pattern represented by the first halftone image data and a dot pattern represented by the second halftone image data correspond to, of the respective scans, a scan in which the first halftone image data precedes the second halftone image data.

According to the present invention, a high-quality image can be generated by controlling the superimposition relationship between dots to be printed while maintaining the dispersibility of a dot pattern when forming an image by printing a plurality of times in the same region on a printing medium.

Further features of the present invention will become apparent from the following description of exemplary embodiments (with reference to the attached drawings).

BRIEF DESCRIPTION OF THE DRAWINGS

FIG. 3 is a view showing the relationship between the head and the image formation region in correspondence with the scanning number;

FIGS. 4A and 4B are views exemplifying processing of generating scanning data from color-separated data;

FIG. 5 is a view showing covering conditions in superimposition control in the first embodiment;

FIGS. 6A to 6C are views exemplifying an ink value division ratio, scanning data setting LUT, and scanning data evaluation correction LUT in the first embodiment;

FIG. 7 is a flowchart showing scanning data setting processing in the first embodiment;

FIGS. 8A to 8C are views showing an outline of setting scanning data in each covering condition;

FIGS. 9A to 9C are views for explaining halftone processing in the first embodiment;

FIGS. 12A and 12B are views exemplifying halftone processing in "covering condition 1";

FIGS. 13A and 13B are views exemplifying halftone processing in "covering condition 2";

FIGS. 14A and 14B are views exemplifying halftone processing in "covering condition 3";

FIGS. 15A to 15C are views exemplifying an ink value division ratio, scanning data setting LUT, and scanning data evaluation correction LUT in a modification to the first embodiment;

FIGS. 16A to 16C are views exemplifying an ink value division ratio, scanning data setting LUT, and scanning data evaluation correction LUT in the second embodiment;

FIGS. 18A to 18C are views exemplifying an ink value division ratio, scanning data setting LUT, and scanning data evaluation correction LUT in the third embodiment;

DESCRIPTION OF THE EMBODIMENTS

Preferred embodiments of the present invention will now be described with reference to the accompanying drawings. It is to be understood that the following embodiments are not intended to limit inventions defined by the claims of the invention, and that not all combinations of features described in the embodiments are indispensable for the means to solve the problems according to the present invention.

First Embodiment

In the first embodiment, image data is generated as a processing target by an image forming apparatus which forms an image by scanning the same region on a printing medium a plurality of times by a printhead including a plurality of printing elements. In each scan, in the same region on a printing medium, printing is performed in accordance with the first image data corresponding to the first color component, and then performed in accordance with the second image data corresponding to the second color component.

Image data is created by the following procedures. First, the first and second scanning data in each scan are set for the first image data and second image data, respectively. Then, the first and second halftone image data in each scan are generated based on the first and second scanning data. When a dot pattern represented by the first halftone image data in each scan and a dot pattern represented by the second halftone image data in each scan are compared, there are sometimes dot patterns having dots at a common pixel position. In the first embodiment, when there are dot patterns having dots at a common pixel position, the first halftone image data is set to correspond to the preceding scan. Accordingly, the first image data is printed as a layer lower than the second image data.

Apparatus Arrangement

Figure 1A:
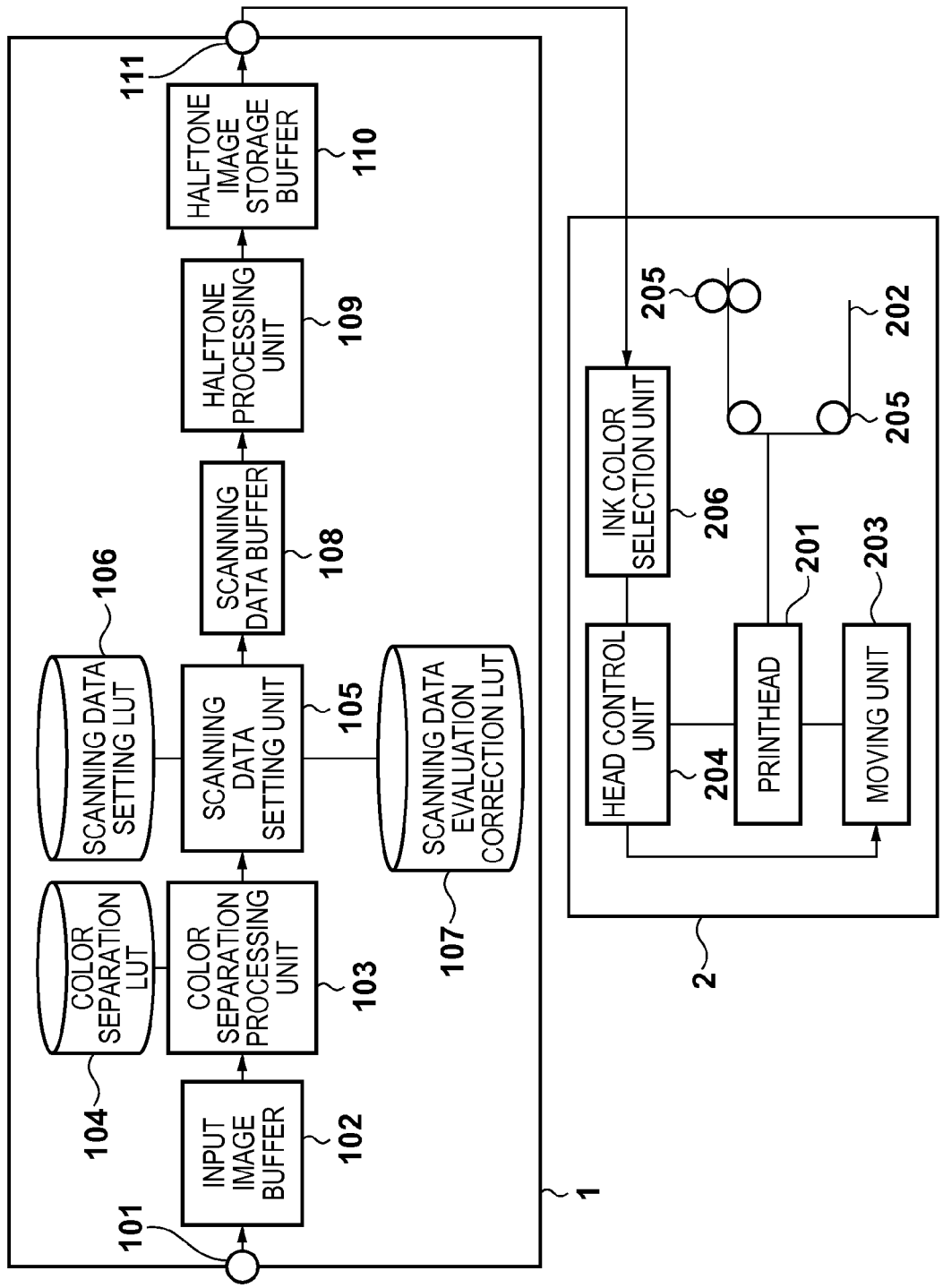
FIG. 1A is a block diagram exemplifying the arrangement of an image processing system according to the present invention.

FIG. 1A is a block diagram showing the arrangement of an image forming system according to the embodiment. Referring to FIG. 1A, an image processing apparatus 1 and image forming apparatus 2 are connected by a printer interface or circuit. The image processing apparatus 1 is implemented as, for example, a printer driver installed in a general personal computer (PC). In this case, each unit of the image processing apparatus 1 to be described later is implemented by executing a predetermined program by the computer. The image forming apparatus 2 may include the image processing apparatus 1.

The image processing apparatus 1 stores, in an input image buffer 102, color image data (to be referred to as color input image data hereinafter) input from an image input terminal 101. The color input image data is formed from three, red (R), green (G), and blue (B) color components. A color separation processing unit 103 separates the color input image data stored in the input image buffer 102 into image data representing densities corresponding to the colors of color materials prepared in the image forming apparatus 2. The color separation processing looks up a color separation lookup table (LUT) 104. The colors of color materials in the embodiment are six types, that is, light cyan (Lc) and light magenta (Lm) which are relatively low in ink density, in addition to four, cyan (C), magenta (M), yellow (Y), and black (K).

A scanning data setting unit 105 further converts image data corresponding to each color material color obtained from the color separation processing unit 103 into data for each scan, based on parameters held as a scanning data setting LUT 106 and scanning data evaluation correction LUT 107. The converted data is stored in a scanning data buffer 108. Scanning data in the embodiment represents the amount of ink applied by each scan. A halftone processing unit 109 binarizes, according to a dither method, scanning data of each color for each scan that is obtained from the scanning data setting unit 105, and stores the obtained binary data (to be referred to as halftone image data hereinafter) in a halftone image storage buffer 110. The halftone image data stored in the halftone image storage buffer 110 is output from an image output terminal 111 to the image forming apparatus 2.

Based on the halftone image data of each color received from the image processing apparatus 1, the image forming apparatus 2 forms an image on a printing medium by moving a printhead 201 in the vertical and horizontal directions relative to a printing medium 202. The printhead 201 prints according to an inkjet method, and includes one or more printing elements (nozzles).

A head control unit 204 controls a moving unit 203, and the printhead 201 moves under this control. A conveyance unit 205 conveys a printing medium under the control of the head control unit 204. An ink color selection unit 206 selects an ink corresponding to halftone image data to be printed from the inks of the colors mounted in the printhead 201, based on halftone image data of each color for each scan that has been formed in the image processing apparatus 1.

Figure 1B:
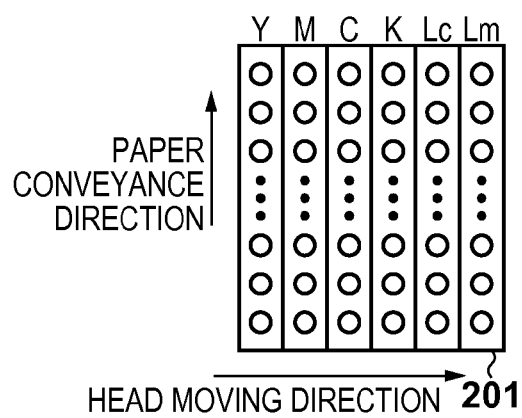
FIG. 1B is a view showing the correspondence between the printhead and the paper conveyance direction.

FIG. 1B exemplifies the arrangement of the printhead 201. In the embodiment, six types of inks, that is, light cyan (Lc) and light magenta (Lm) in addition to four, cyan (C), magenta (M), yellow (Y), and black (K) are mounted in the printhead 201, as described above. For descriptive convenience, the embodiment will exemplify an arrangement in which a plurality of nozzles are aligned in a direction (sub-scanning direction) in which a printing medium is conveyed. However, the number and arrangement of nozzles are not limited to this example. For example, the printhead may include nozzles which differ in discharge amount even for the same color at the same density, or include a plurality of arrays of nozzles having the same discharge amount. Further, nozzles may be arranged in a zigzag pattern.

Image Formation Processing

Figure 2:
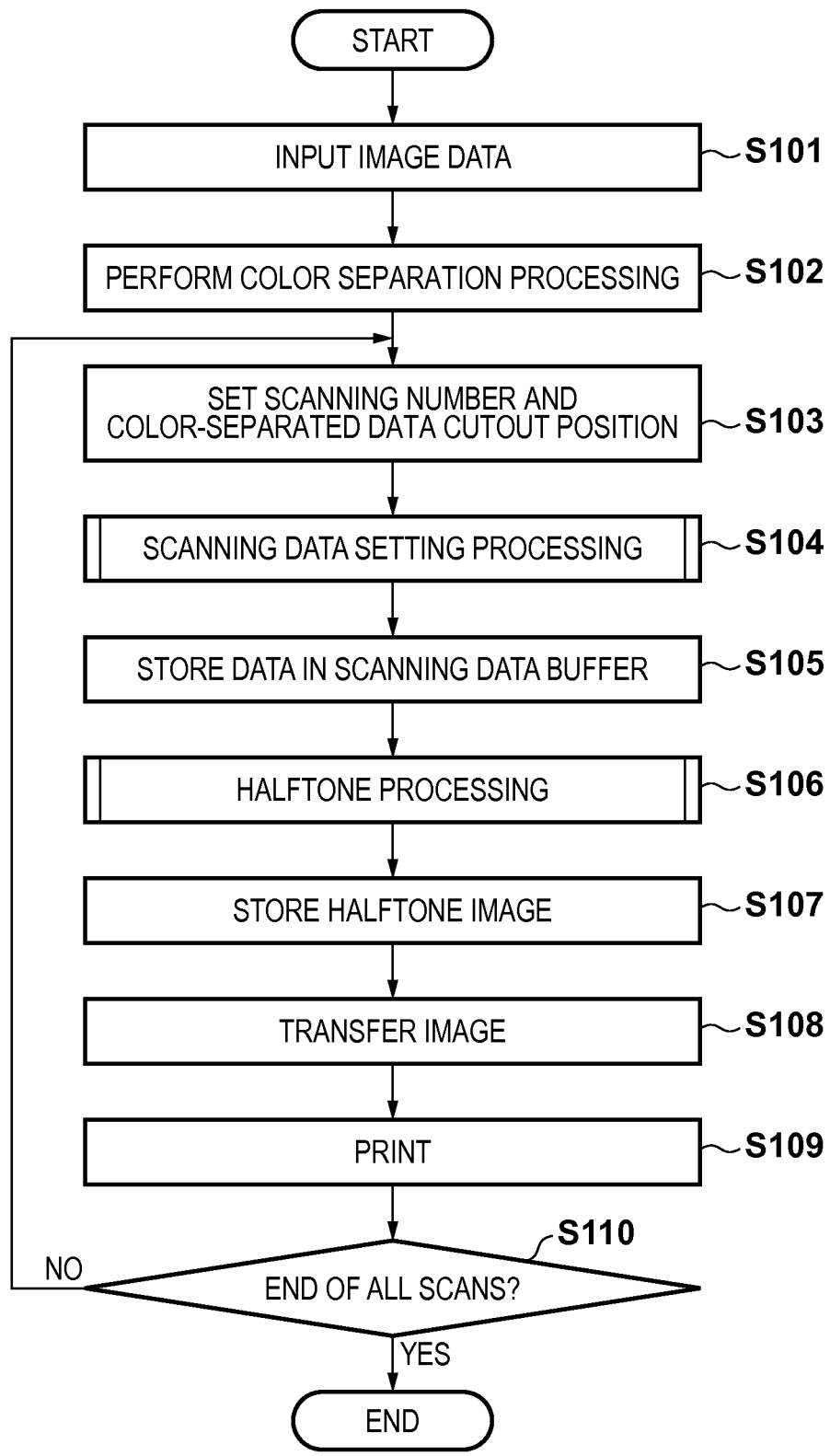
FIG. 2 is a flowchart showing image formation processing in the first embodiment.

Image formation processing in the image forming system having the above-described functional arrangement according to the embodiment will be explained with reference to the flowchart of FIG. 2. The embodiment will explain an example in which cyan and yellow are applied as inks having an upper layer/lower layer relationship out of the six types of inks. The present invention is also applicable to a combination of other inks, as a matter of course. The embodiment will explain scanning data generation control when the fixing order of cyan and yellow is controlled to fix cyan on an upper layer and yellow on a lower layer in a formed image.

First, in step S101, multi-tone color input image data is input from the image input terminal 101 and stored in the input image buffer 102. The input image data is formed from three, red (R), green (G), and blue (B) color components.

Then, in step S102, the color separation processing unit 103 separates R, G, and B color input image data into C, M, Y, K, Lc, and Lm color data by using the color separation LUT 104. By looking up the color separation LUT 104, the color separation processing unit 103 converts R, G, and B color image data of the input image data into color-separated image data C_d, M_d, Y_d, K_d, Lc_d, and Lm_d corresponding to C, M, Y, K, Lc, and Lm color densities. The color-separated image data will be simply referred to as color-separated data. Pixel data after the color separation processing is handled as 8-bit data of 0 to 255, but the tone level of the pixel is not limited to 256 levels.

In step S103, the scanning data setting unit 105 sets a scanning number k, and a Y-coordinate value Ycut(k) serving as a color-separated image data cutout position. Ycut(k) is a color-separated image data cutout position at the scanning number k, and corresponds to the Y-coordinate of the upper ends of nozzles. The scanning number k has an initial value of 1 and is incremented by one for every processing loop.

An example in which printing elements for each color in the printhead 201 include 16 nozzles will be explained. Also, 4-pass printing in which the printhead 201 forms an image by four scans in the same main scanning printing region on an image will be exemplified. A method of setting the Y-coordinate (printing paper conveyance direction) Ycut(k) of the color-separated image data cutout position in this example will be explained. Generally in 4-pass printing, as shown in FIG. 3, an image is formed in region A using only ¼ nozzles at the lower end when the scanning number has the initial value (k=1). When the scanning number k=2, paper is fed by ¼ of the nozzle length from the paper position for the scanning number k=1, and an image is formed in region B and region A. When the scanning number k=3, paper is further fed by ¼ of the nozzle length from the paper position for the scanning number k=2, and an image is formed. The image formation and paper feeding are repeated, forming a final output image. For the scanning number k=1, the color-separated data cutout position Ycut(1) corresponding to the Y-coordinate of the upper ends of nozzles is −12. Letting Nzzl be the number of nozzles of one array, Pass be the number of passes, and k be the scanning number, the color-separated data cutout position Ycut(k) is given by $$Ycut(k) = -Nzzl + (Nzzl/Pass) \times k \quad (1)$$

This processing is performed for all color-separated images for the respective colors.

After Ycut(k) is set in the above manner, the scanning data setting unit 105 sets printing data for each scan based on the scanning data setting LUT 106 and scanning data evaluation correction LUT 107 in step S104.

The scanning data setting unit 105 sets two scanning data (upper scanning data and lower scanning data) for each scan from color-separated image data corresponding to each color. The upper scanning data and lower scanning data are a signal value serving as an upper limit and a signal value serving as a lower limit in a possible signal value range of color-separated image data divided for each scan. For example, assume that the signal value of a given pixel of interest forming color-separated image data is 255 and is equally divided into four passes. At this time, a signal value range of 0 to 64 out of the signal value "255" of the pixel of interest is assigned to the first pass. Hence, an upper signal value corresponding to the printing scan of the first pass in the pixel of interest is 64, and a lower signal value is 0. Also, a signal value range of 64 to 128 is assigned to the second pass, an upper signal value is 128, and a lower signal value is 64. When the pixel value of the pixel of interest is 100, an upper signal value corresponding to the printing scan of the first pass is 25 and a lower signal value is 0. An upper signal value corresponding to the printing scan of the second pass is 50, a lower signal value is 26, and a signal value range of 26 to 50 is assigned. An upper signal value corresponding to the printing scan of the third pass is 75, a lower signal value is 51, and a signal value range of 51 to 75 is assigned. An upper signal value corresponding to the fourth pass is 100, a lower signal value is 76, and a signal value range of 76 to 100 is assigned. In this fashion, the upper signal values of all pixels serve as upper scanning data in accordance with signal value ranges assigned to respective scans, and the lower signal values of all pixels serve as lower scanning data.

For cyan, cyan upper scanning data and cyan lower scanning data are generated from color-separated image data for each scan. For yellow, yellow upper scanning data and yellow lower scanning data are generated similarly. In the embodiment, upper scanning data and lower scanning data corresponding to yellow are corrected in accordance with cyan and yellow color-separated image data in order to print yellow dots as a layer lower than cyan dots (superimposition control). Details of the superimposition control will be described later.

Note that the embodiment exemplifies cyan and yellow as superimposition control targets. Colors other than superimposition control targets, that is, magenta, black, light cyan, and light magenta undergo the same processing as that for cyan. However, these colors not to undergo superimposition control are not limited to the processing described in the embodiment, but may undergo another control. For example, color-separated image data may be divided as scanning data for respective scans without generating upper scanning data or lower scanning data.

Figure 1C:
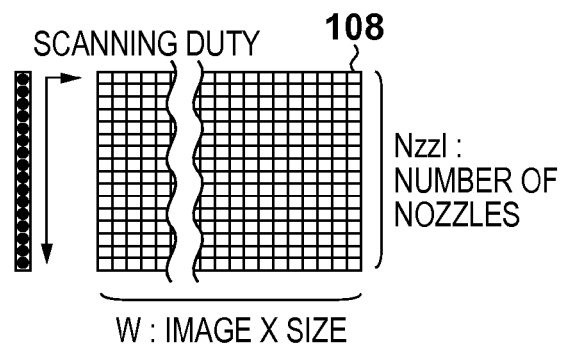
FIG. 1C is a view showing the relationship between the scanning buffer and nozzles.

In step S105, the scanning data setting unit 105 stores, in the scanning data buffer 108, the upper scanning data and lower scanning data corresponding to each color which have been set in step S104. FIG. 1C exemplifies the arrangement of the scanning data buffer 108 in the embodiment. As shown in FIG. 1C, the scanning data buffer 108 stores, for each color, band-like scanning data in which the vertical direction corresponds to the nozzle array and the horizontal direction corresponds to the image X (horizontal direction) size. However, scanning data may be set without using the scanning data buffer 108.

In the embodiment, when the Y-coordinate of a corresponding nozzle falls outside the image Y address (vertical address) region, scanning data for this nozzle is set to 0. FIG. 4A is a schematic view showing a state in which scanning data is generated by multiplying color-separated data by the scanning data setting LUT 106 in the embodiment. In FIG. 4A, the vertical axis corresponds to the nozzle array in the scanning data setting LUT and scanning data. In the embodiment, as described above, scanning data are calculated as upper scanning data and lower scanning data. In the scanning data setting LUT and scanning data shown in FIG. 4A, a solid line 1801 having white and black quadrate symbols at two ends corresponds to upper scanning data, and a dotted line 1802 having white and black rhombus symbols at two ends corresponds to lower scanning data. In FIG. 4A, the image Y address becomes negative for ¾ of the nozzle array at the upper end, so 0 is substituted into both upper scanning data and lower scanning data. As a result, significant scanning data is set for only ¼ of the nozzle array at the lower end.

Figure 4B:
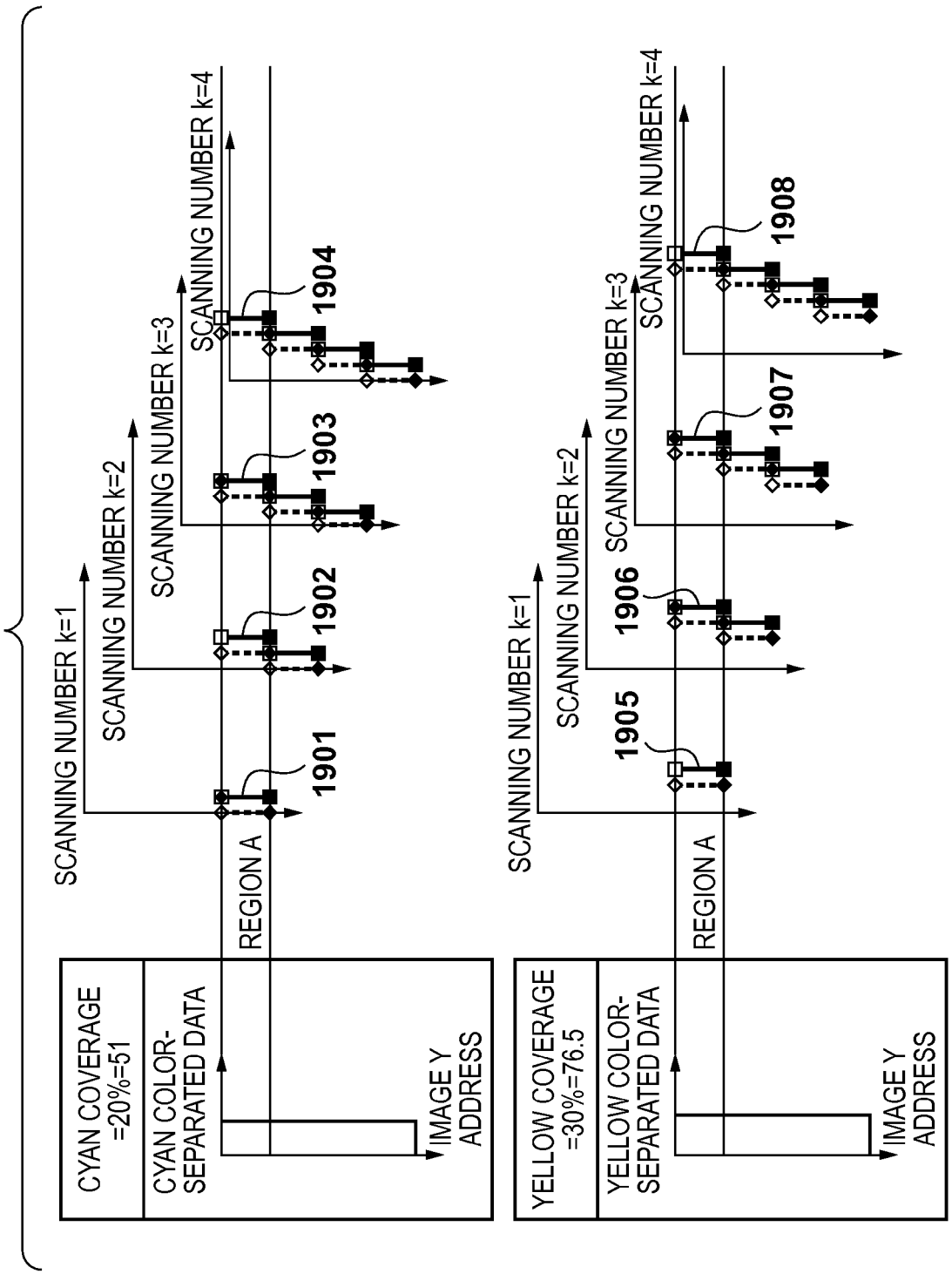

The color-separated data cutout position Ycut(k) is determined by the scanning number k. For the scanning number k=1 to 4, scanning data is determined as shown in FIG. 4B. FIG. 4B shows a state in which region A is formed by four scans at the scanning number k=1 to 4 by repeating scanning while feeding paper. The upper part of FIG. 4B shows scanning data (lower scanning data U_C_d indicated by dotted lines and upper scanning data O_C_d indicated by solid lines) at nozzle positions corresponding to respective scanning numbers for cyan. This reveals that scanning data differs between the respective scanning numbers. Each of cyan scanning data 1901 to 1904 in FIG. 4B is determined by the product (equations (11) and (12) to be described later) of color-separated data and a corresponding set value (division ratio) in the scanning data setting LUT 106. To the contrary, yellow scanning data (lower scanning data U_Y_d indicated by dotted lines and upper scanning data O_Y_d indicated by solid lines) 1905 to 1908 shown on the lower part of FIG. 4B are corrected (equations (19) and (20) to be described later) based on a correction amount h1, which will be described later. The value of the correction amount h1 changes depending on the values of cyan and yellow color-separated data.

In step S106, the halftone processing unit 109 performs halftone processing to convert each of upper scanning data and lower scanning data corresponding to each color into binary data. In this case, halftone processing using a dither method is executed, obtaining upper halftone image data and lower halftone image data. Further, the lower halftone image data is subtracted from the upper halftone image data, generating halftone image data corresponding to a color to be processed. Details of the halftone processing will be described later.

In step S107, the halftone processing unit 109 stores halftone image data corresponding to each color in the halftone image storage buffer 110. FIG. 9C shows a state in which cyan halftone image data of the scanning number k=1 is stored in the halftone image storage buffer 110. As shown in FIG. 9C, the halftone image storage buffer 110 stores binary data of (number of nozzles: Nzzl) corresponding to a pixel position representing input image data×(image X size: W).

In step S108, the halftone image data stored in the halftone image storage buffer 110 is output from the image output terminal 111 and transferred to the image forming apparatus 2. In step S109, the image forming apparatus 2 selects a color material matching the acquired halftone image data, and starts a printing operation. As the printing operation, the printhead 201 is moved from left to right with respect to a printing medium, as shown in FIG. 1B, thereby printing an image on the printing medium. Finally, in step S110, it is determined whether all scans have ended. If all scans have ended, a series of image formation processes is completed; if not all scans have ended, the process returns to step S103.

Scanning Data Setting Processing

The scanning data setting processing in step S104 will be explained in detail.

Outline of Scanning Data Setting Processing

First, case determination in the processing in accordance with cyan and yellow color-separated image data will be explained with reference to FIG. 5. As described above, each pixel forming color-separated image data has a pixel value representing a density in the range of 0 to 255. A case in which the sum of a cyan pixel value and yellow pixel value is smaller than 255 (that is, the coverage is lower than 100%) will be called "covering condition 1". In this case, the paper surface (printing medium) is not completely filled with yellow dots 1404 and cyan dots 1405, and a blank portion of the paper surface remains in a formed image, as represented by reference numeral 1401 in FIG. 5. In "covering condition 1", cyan and yellow dots can be controlled not to overlap each other.

A case in which the sum of a cyan pixel value and yellow pixel value after color separation is equal to or larger than 255 and the difference between these colors that is calculated by a predetermined calculation is small will be called "covering condition 2". In this case, the paper surface (printing medium) is completely filled with cyan dots or yellow dots, as represented by reference numeral 1402 in FIG. 5. In "covering condition 2", there are pixels in which both cyan and yellow dots are printed. In these pixels, cyan is printed as an upper layer, and yellow is printed as a lower layer. That is, in "covering condition 2", cyan and yellow dots are controlled to overlap each other so that the cyan dot is printed as an upper layer and the yellow dot is printed as a lower layer.

A case in which the sum of a cyan pixel value and yellow pixel value is equal to or larger than 255 and the difference between these colors that is calculated by a predetermined calculation is large will be called "covering condition 3". In this case, the paper surface (printing medium) is completely filled with cyan dots or yellow dots, as represented by reference numeral 1403 in FIG. 5. Cyan dots are inevitably printed on the yellow dot lower layer in some pixels represented by reference numeral 1406. However, priority is given to print cyan as an upper layer and yellow as a lower layer.

Scanning Data Setting LUT

The scanning data setting LUT 106 to be looked up when the scanning data setting unit 105 divides color-separated image data for respective scans will be described in detail below.

FIG. 6A exemplifies the ink value division ratio when 4-pass printing is performed to form an image in the same region on a printing medium by four scans of the printhead 201. The printhead 201 includes 16 nozzles on one array of each color. In FIG. 6A, the vertical axis indicates the nozzle position, and the horizontal axis indicates the ink value division ratio. The ink value division ratio is the ratio at which color-separated image data is divided for respective scans in 4-pass printing, and will be simply called a division ratio. In the example of FIG. 6A, division ratios for 16 nozzles can be calculated by setting the nozzle position ny=3, 7, 11, 15 for every four nozzles and performing linear interpolation for the respective points. In the example of FIG. 6A, letting $D\_C\_d(ny)$ be the division ratio of cyan color-separated image data, $D\_C\_d(3)=D\_C\_d(7)=D\_C\_d(11)=D\_C\_d(15)=0.25$. That is, for cyan, color-separated image data is equally divided at a ratio of ¼=0.25 for respective scans in all four passes. That is, for a given ink color, the division ratio $D\_d$ at each nozzle position has the following characteristic:

$$D\_d(3)+D\_d(7)+D\_d(11)+D\_d(15)=1.0 \quad (2)$$

The cyan division ratio $D\_C\_d$ and yellow division ratio $D\_Y\_d$ are given as a function of the nozzle position ny:

$$D\_C\_d(ny)=0.25$$

$$D\_Y\_d(ny)=0.25 \text{ (where } 0 \le ny < Nzzl) \quad (3)$$

As for the division ratios $D\_M\_d$, $D\_K\_d$, $D\_Lc\_d$, and $D\_Lm\_d$ of the four remaining colors M, K, Lc, and Lm, the value of 0.25 is given regardless of the nozzle position, similar to equations (3). For descriptive convenience, image formation using two, C (Cyan) and Y (Yellow) will be exemplified.

Assume that the division ratio (FIG. 6A) given by equations (3) is set for cyan and yellow. In this case, the relationships between nozzle positions and LUT values (first parameters) for cyan and yellow are set as the scanning data setting LUT 106, as represented by 1201 and 1204 in FIG. 6B. As is apparent from FIG. 6B, two LUTs, that is, a lower LUT indicated by dotted lines and an upper LUT indicated by solid lines are set in the cyan scanning data setting LUT 1201. The lower LUT is data indicated by dotted lines each having white and black rhombus symbols at two ends, and represents a table for generating lower scanning data. The upper LUT is data indicated by solid lines each having white and black quadrate symbols at two ends, and represents a table for generating upper scanning data. As for yellow, the scanning data setting LUT 1204 is set similarly.

A lower LUT $U\_C\_LUT(ny)$ and upper LUT $O\_C\_LUT(ny)$ for cyan are generated using the division ratio of cyan scanning data shown in FIG. 6A according to the following rules, obtaining the scanning data setting LUT 1201 shown in FIG. 6B:

$$U\_C\_LUT(ny)=D\_C\_d(ny+Nzzl/4)+D\_C\_d(ny+2\times Nzzl/4)+D\_C\_d(ny+3\times Nzzl/4) \quad (4)$$

$$O\_C\_LUT(ny)=D\_C\_d(ny)+D\_C\_d(ny+Nzzl/4)+D\_C\_d(ny+2\times Nzzl/4)+D\_C\_d(ny+3\times Nzzl/4) \quad (5)$$

where $0 \le nx < $ image X size, and $0 \le ny < Nzzl$.

The U_C_LUT and O_C_LUT values in the embodiment are as follows:

For $0 \leq ny < 4, U\_C\_LUT(ny)=0.75, O\_C\_LUT(ny)=1.0$

For $4 \leq ny < 8, U\_C\_LUT(ny)=0.5, O\_C\_LUT(ny)=0.75$

For $8 \leq ny < 12, U\_C\_LUT(ny)=0.25, O\_C\_LUT(ny)=0.5$

For $12 \leq ny < 16, U\_C\_LUT(ny)=0.0, O\_C\_LUT(ny)=0.25$ (6)

Scanning Data Evaluation Correction LUT

The scanning data evaluation correction LUT 107 used for case determination based on the above-mentioned covering conditions when the scanning data setting unit 105 divides color-separated image data for respective scans will be explained in detail. Assume that the division ratio (FIG. 6A) given by equations (3) is set for cyan and yellow. In this case, the relationships between nozzle positions and LUT values (second parameters) for cyan and yellow are set as the scanning data evaluation correction LUT 107, as represented by 1301 and 1306 in FIG. 6C. The LUT 1301 shown in FIG. 6C is a cyan scanning data evaluation correction LUT, and is used to evaluate cyan (upper layer) scanning data. The LUT 1306 shown in FIG. 6C is a yellow scanning data evaluation correction LUT, and is used to evaluate yellow (lower layer) scanning data. Scanning data of yellow to be set on a lower layer is corrected using the cyan scanning data evaluation correction LUT 1301 and yellow scanning data evaluation correction LUT 1306.

The cyan scanning data evaluation correction LUT 1301 shown in FIG. 6C is generated according to the following rules:

$H1\_C\_1\_LUT(ny)=D\_C\_d(ny+3\times Nzzl/4)$ $H1\_C\_2\_LUT(ny)=D\_C\_d(ny+3\times Nzzl/4)+D\_C\_d(ny+2\times Nzzl/4)$ $H1\_C\_3\_LUT(ny)=D\_C\_d(ny+3\times Nzzl/4)+D\_C\_d(ny+2\times Nzzl/4)+D\_C\_d(ny+Nzzl/4)$ $H1\_C\_4\_LUT(ny)=D\_C\_d(ny+3\times Nzzl/4)+D\_C\_d(ny+2\times Nzzl/4)+D\_C\_d(ny+Nzzl/4)+D\_C\_d(ny)$ (7)

The above equations represent a case in which the nozzle position satisfies $0 \leq ny < 4$. For the fourth and subsequent nozzles, values set for the $(0 \leq ny < 4)$th nozzles are repetitively applied.

From this, the set values of the cyan scanning data evaluation correction LUT 1301 are as follows:

$H1\_C\_1\_LUT(ny)=0.25$ $H1\_C\_2\_LUT(ny)=0.5$ $H1\_C\_3\_LUT(ny)=0.75$ $H1\_C\_4\_LUT(ny)=1.0$ (8)

The yellow scanning data evaluation correction LUT 1306 shown in FIG. 6C is generated according to the following rules:

$H1\_Y\_1\_LUT(ny)=0.0$ $H1\_Y\_2\_LUT(ny)=D\_Y\_d(ny+3\times Nzzl/4)$ $H1\_Y\_3\_LUT(ny)=D\_Y\_d(ny+3\times Nzzl/4)+D\_Y\_d(ny+2\times Nzzl/4)$ $H1\_Y\_4\_LUT(ny)=D\_Y\_d(ny+3\times Nzzl/4)+D\_Y\_d(ny+2\times Nzzl/4)+D\_Y\_d(ny+1\times Nzzl/4)$ (9)

The above equations represent a case in which the nozzle position satisfies $0 \leq ny < 4$. For the fourth and subsequent nozzles, values set for the $(0 \leq ny < 4)$th nozzles are repetitively applied.

Hence, the set values of the yellow scanning data evaluation correction LUT 1306 are as follows:

$H1\_Y\_1\_LUT(ny)=0.0$ $H1\_Y\_2\_LUT(ny)=0.25$ $H1\_Y\_3\_LUT(ny)=0.5$ $H1\_Y\_4\_LUT(ny)=0.75$ (10)

In the embodiment, corrected cyan and yellow scanning data are set using the scanning data setting LUT 106 and scanning data evaluation correction LUT 107 for cyan and yellow that are created in the above-described way. The reason why the scanning data evaluation correction LUT 107 is set in the above-described way will be described later.

Scanning Data Setting Flowchart

FIG. 7 is a flowchart showing the scanning data setting processing by the scanning data setting unit 105 in step S104. The procedures of this processing will be explained in detail. First, in step S201, cyan color-separated image data is multiplied by the upper and lower LUTs, generating cyan scanning data, that is, upper scanning data and lower scanning data. The lower scanning data U_C_d and upper scanning data O_C_d of cyan are always fixed as represented by equations (11) and (12) regardless of the "covering condition 1" 1401, "covering condition 2" 1402, and "covering condition 3" 1403 shown in FIG. 5:

$U\_C\_d(nx,ny)=C\_d(nx,ny+Ycut(k))\times U\_C\_LUT(ny)$ (11)

$O\_C\_d(nx,ny)=C\_d(nx,ny+Ycut(k))\times O\_C\_LUT(ny)$ (12)

After calculating cyan scanning data, processes in steps S202 to S207 are executed for each pixel to calculate yellow scanning data. In step S202, it is determined whether "covering condition 1" shown in FIG. 5 is satisfied. That is, it is determined whether the sum of image data representing cyan and yellow densities in the pixel of interest in color-separated image data is smaller than a possible maximum value, that is, 255 (equation (13): first correction determination condition):

$C\_d+Y\_d<255$ (13)

If the sum of pixel values is smaller than 255, the process shifts to step S204; if it is equal to or larger than 255, to step S203.

In step S203, it is determined whether the pixel of interest satisfies either "covering condition 2" or "covering condition 3". This determination is based on whether a difference parameter serving as the difference between results of multiplying cyan and yellow image data by the scanning data evaluation correction LUT 107 is equal to or smaller than the difference between 255 and yellow image data (second correction determination condition). If the second correction determination condition is true, a value obtained by subtracting yellow image data from the maximum value "255" of image data is set as the correction amount h1. If the second correction determination condition is false, the difference parameter is set as the correction amount h1. In the determination of step S203, it is determined whether $C\_d+Y\_d \geq 255$ and a maximum value among reference values Tmp1 to Tmp4 is equal to or smaller than 255−Y_d, as represented by equations (14) and (15). The reference values Tmp1 to Tmp4 are values each obtained by multiplying cyan and yellow pixel values in color-separated image data by corresponding values of the scanning data evaluation correction LUT, and calculating the difference between the products for each nozzle position ny which satisfies 0≤ny<4:

$$Tmp1=C\_d(nx,ny+Ycut(k))\times H1\_C\_1\_LUT(ny)-Y\_d(nx,ny+Ycut(k))\times H1\_Y\_1\_LUT(ny)$$

$$Tmp2=C\_d(nx,ny+Ycut(k))\times H1\_C\_2\_LUT(ny)-Y\_d(nx,ny+Ycut(k))\times H1\_Y\_2\_LUT(ny)$$

$$Tmp3=C\_d(nx,ny+Ycut(k))\times H1\_C\_3\_LUT(ny)-Y\_d(nx,ny+Ycut(k))\times H1\_Y\_3\_LUT(ny)$$

$$Tmp4=C\_d(nx,ny+Ycut(k))\times H1\_C\_4\_LUT(ny)-Y\_d(nx,ny+Ycut(k))\times H1\_Y\_4\_LUT(ny)$$

$$C\_d+Y\_d \geq 255 \text{ and } Max(Tmp1 \sim Tmp4) \leq 255-Y\_d(nx,ny+Ycut(k)) \quad (14)$$

$$C\_d+Y\_d \geq 255 \text{ and } Max(Tmp1 \sim Tmp4) > 255-Y\_d(nx,ny+Ycut(k)) \quad (15)$$

If equation (14) is satisfied, it is determined that "covering condition 2" is satisfied, and the process shifts to step S205. If equation (15) is satisfied, it is determined that "covering condition 3" is satisfied, and the process shifts to step S206.

In step S204, the correction amount h1 for "covering condition 1" is calculated according to equation (16):

$$h1=C\_d(nx,ny+Ycut(k)) \quad (16)$$

The correction amount h1 is a value for correcting upper scanning data and lower scanning data of yellow.

As is apparent from equation (16), when cyan and yellow pixel values satisfy "covering condition 1", the cyan pixel value is directly used for correction of upper scanning data and lower scanning data of yellow.

In step S205, the correction amount h1 for "covering condition 2" is calculated according to equation (17):

$$h1=255-Y\_d(nx,ny+Ycut(k)) \quad (17)$$

In step S206, the correction amount h1 for "covering condition 3" is calculated according to equation (18):

$$h1=Max(Tmp1 \sim Tmp4) \quad (18)$$

In step S207, the upper scanning data O_Y_d and lower scanning data U_Y_d of yellow are calculated according to equations (19) and (20) using the correction value h1 calculated in one of steps S204 to S206:

$$U\_Y\_d(nx,ny)=Y\_d(nx,ny+Ycut(k))\times Y\_LUT(ny)+h1 \quad (19)$$

$$O\_Y\_d(nx,ny)=Y\_d(nx,ny+Ycut(k))\times Y\_LUT(ny)+h1 \quad (20)$$

Figure 8B:
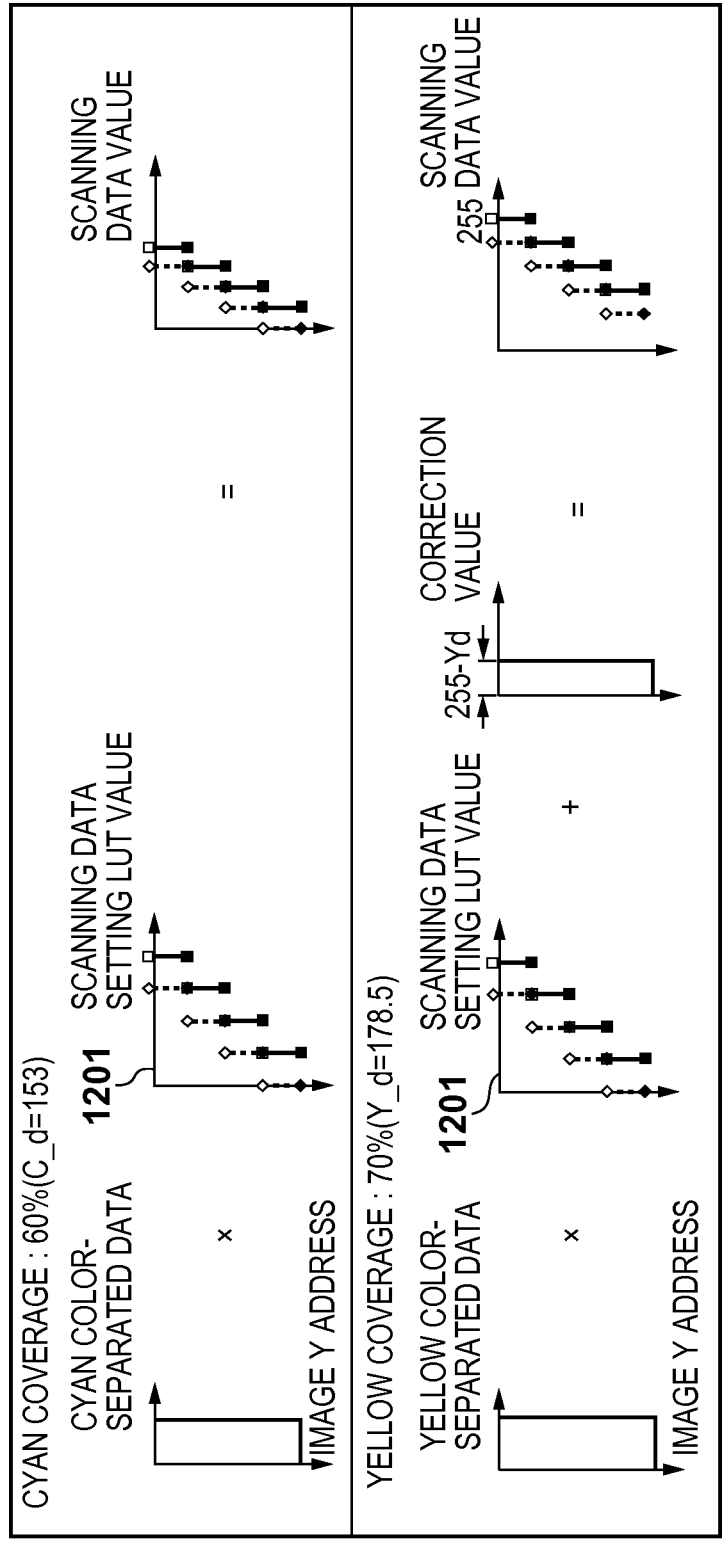
Figure 8C:
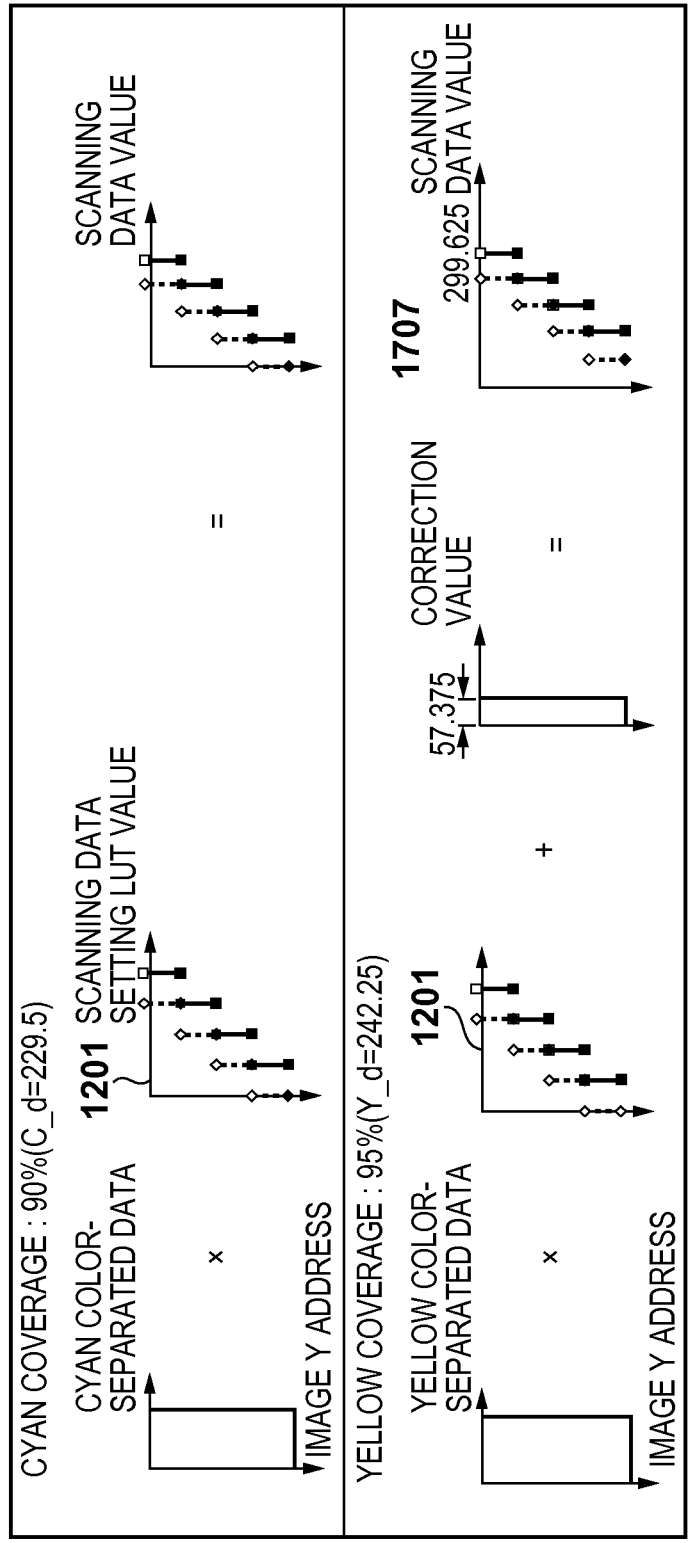

FIG. 8A exemplifies creation of scanning data in "covering condition 1". In FIG. 8A, cyan color-separated data 1501 is C_d=51, yellow color-separated data 1502 is Y_d=76.5, and "covering condition 1" is satisfied. At this time, the cyan color-separated data 1501 is multiplied by corresponding values of the scanning data setting LUT 1201, creating cyan scanning data 1503, as represented by equations (11) and (12) described above. In contrast, the yellow color-separated data 1502 is multiplied by corresponding values of the scanning data setting LUT 1201, and a correction amount h1 1506 is further added, creating yellow scanning data 1507, as represented by equations (19) and (20) described above. Similarly, FIGS. 8B and 8C exemplify creation of scanning data in "covering condition 2" and "covering condition 3". In the embodiment, scanning data for yellow is corrected by adding the correction amount h1 calculated in accordance with the covering condition. The effect of correction using the correction amount h1 will be described later.

In step S104, scanning data is set by the above-described processing. For magenta, black, light cyan, and light magenta for which upper layer/lower layer control is not performed, scanning data is calculated by the same method as that for cyan.

Halftone Processing

The halftone processing in step S106 will be described in detail. As the halftone processing in the embodiment, a well-known dither method is applied to upper scanning data and lower scanning data of each color. To simplify the description, halftone processing for cyan and yellow at the scanning number k=1 in 4-pass printing will be exemplified.

Figure 10:
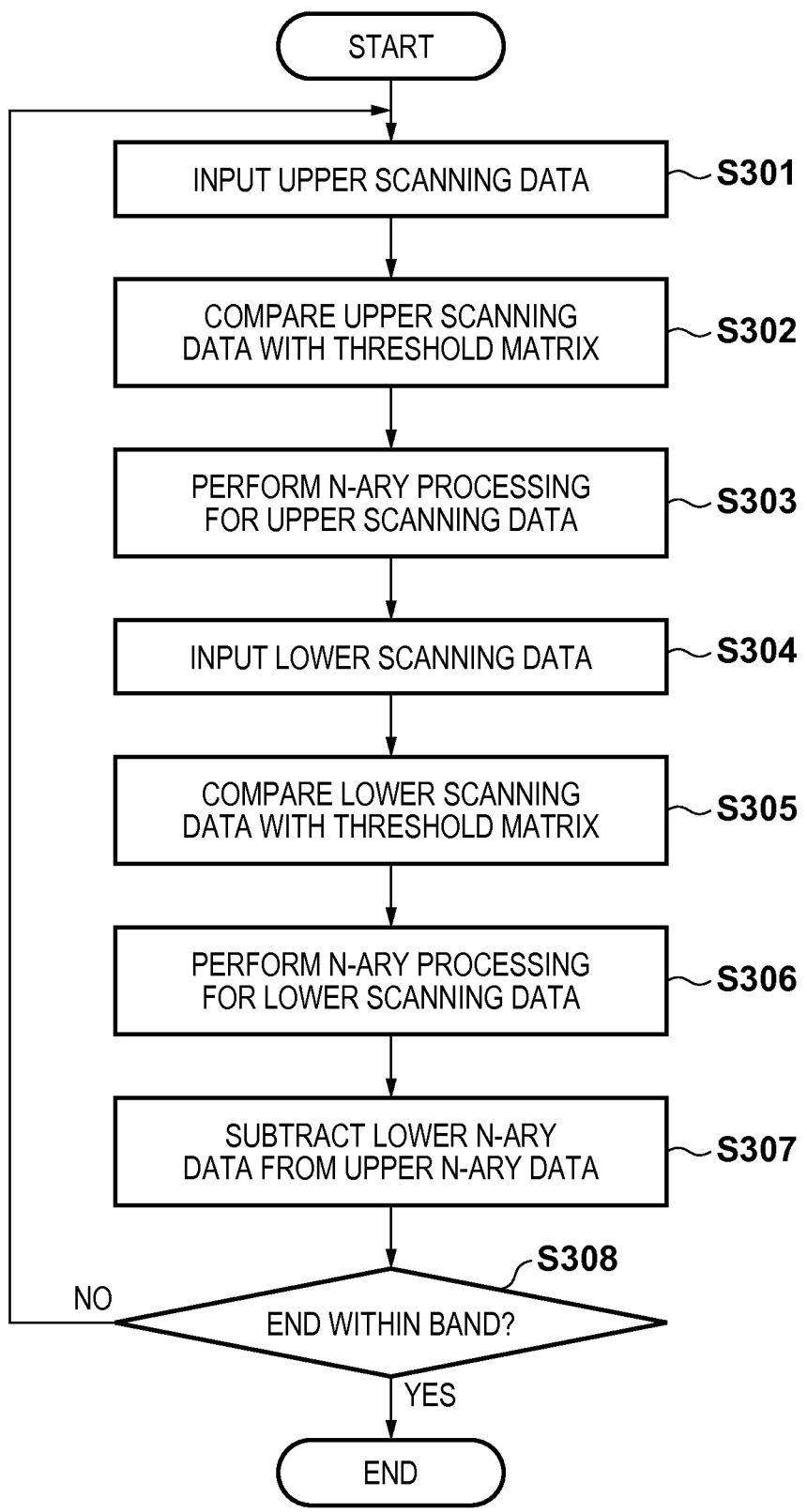
FIG. 10 is a flowchart showing halftone processing in the first embodiment.

FIG. 9A is a block diagram showing the detailed arrangement of the halftone processing unit 109. FIG. 10 is a flow-chart showing the halftone processing. The halftone processing will be explained with reference to FIGS. 9A and 10.

First, in step S301 shown in FIG. 10, the halftone processing unit 109 receives cyan upper scanning data O_C_d and yellow upper scanning data O_Y_d.

Then, in step S302, an N-ary processing unit 2002 in the halftone processing unit 109 compares an upper pixel value forming the cyan upper scanning data O_C_d with a threshold in a corresponding threshold matrix Th in a threshold matrix group 2001. In step S303, N-ary processing is performed based on the comparison result, outputting N-ary data as cyan upper halftone image data Out_O_C. As for yellow, an upper pixel value forming the upper scanning data O_Y_d is converted into N-ary data by comparison with a threshold in the threshold matrix Th, outputting the N-ary data as yellow upper halftone image data Out_O_Y.

FIG. 9B exemplifies the threshold matrix used in the N-ary processing of step S303. The threshold matrix group 2001 is formed from a plurality of matrices Th_1 to Th_N−1. The matrix Th_1 is formed from element values of 1 to 255, and the matrix Th_2 is formed from element values of 256 to 510. For the matrix Th_N−1, the minimum element value is (N−2)×256+1, and the maximum element value is (N−2)×256+255. Note that N is an N-ary number and is a natural number of 2 or more.

In step S303, for example, cyan and yellow upper scanning data undergo the following N-ary processing using the threshold matrix.

First, the cyan upper scanning data O_C_d undergoes N-ary processing according to the following rules:

$$\text{For } O\_C\_d < Th\_1, \quad (21)$$

$$Out\_0\_C = 0$$

$$\text{For } Th\_1 \leq O\_C\_d < Th\_2,$$

$$Out\_0\_C = 1$$

$$\text{For } Th\_2 \leq O\_C\_d < Th\_3,$$

$$Out\_0\_C = 2$$

$$\vdots$$

$$\text{For } Th\_N-2 \leq O\_C\_d < Th\_N-1,$$

$$Out\_0\_C = N-2$$

$$\text{For } Th\_N-2 < O\_C\_d,$$

$$Out\_0\_C = N-1$$

Similarly, the yellow upper scanning data O_Y_d undergoes N-ary processing.

After the end of N-ary processing for the upper scanning data, lower scanning data undergo N-ary processing similarly to equations (21). First, in step S304, cyan lower scanning data U_C_d and yellow lower scanning data U_Y_d are input. Then, in step S305, an N-ary processing unit 2003 compares a lower pixel value forming the cyan lower scanning data U_C_d with a threshold in a corresponding threshold matrix Th. In step S306, N-ary processing is performed based on the comparison result, outputting N-ary data as cyan lower halftone image data Out_U_C. As for yellow, a lower pixel value forming the lower scanning data U_Y_d is converted into N-ary data by comparison with a threshold in the threshold matrix Th, outputting the N-ary data as yellow lower halftone image data Out_U_Y.

The threshold matrix group 2001 used in N-ary processing in the embodiment is a dot dispersion threshold matrix. The dispersion matrix desirably has a blue noise characteristic, but may be another dot dispersion array (for example, the Bayer array or green noise array). In the embodiment, the same matrices (FIG. 9B) are used as the threshold matrix group 2001 regardless of the scanning number and color.

In step S307, an arithmetic unit 2004 calculates N-ary data of each color as the difference between the upper N-ary data and the lower N-ary data. More specifically, N-ary image data for cyan and yellow are calculated according to equations (22) and (23):

$$Out\_C = Out\_O\_C - Out\_U\_C \quad (22)$$

$$Out\_Y = Out\_O\_Y - Out\_U\_Y \quad (23)$$

In step S308, the processes in steps S301 to S307 are performed for pixels at all addresses (0, 0) to (W-1, Nzzl-1) within the band, generating N-ary image data which determine final dot positions for cyan and yellow. The N-ary image data will be called halftone image data.

Influence of Scanning Data Correction on Halftone Processing

As described above, in the embodiment, the scanning data setting unit 105 calculates the correction value h1 corresponding to one of covering condition 1 to covering condition 3, and corrects scanning data of yellow serving as a lower layer for cyan by using the correction value h1. The halftone processing unit 109 executes halftone processing for the corrected scanning data, outputting cyan halftone image data Out_C and yellow halftone image data Out_Y. The influence of corrections corresponding to covering condition 1 to covering condition 3 on halftone processing will be explained by comparing calculation processes and the like. Note that the calculation target is assumed to be a 4×4 dot region in region A shown in FIG. 4B.

Figure 11:
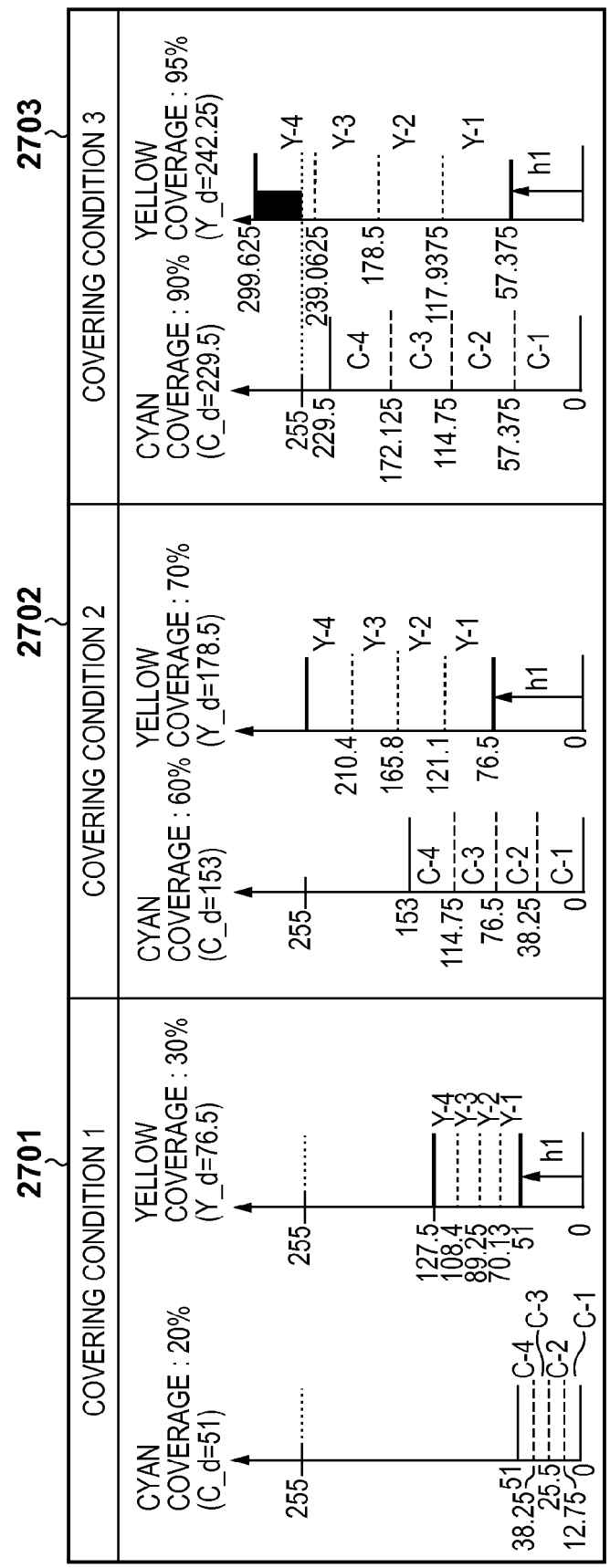
FIG. 11 is a view showing a scanning data range in the first embodiment.

Correction of upper scanning data O_Y_d and lower scanning data U_Y_d of yellow in each covering condition will be explained with reference to FIG. 11. FIG. 11 exemplifies a scanning data signal value range (scanning data range) calculated in the above-described fashion for cyan color-separated data C_d and yellow color-separated data Y_d. In FIG. 11, for example, cyan scanning numbers 1 to 4 are represented by C-1 to C-4, and yellow scanning numbers 1 to 4 are represented by Y-1 to Y-4. For example, C-1 and Y-1 represent the first pass in all four passes in the same region.

In FIG. 11, "covering condition 1" 2701 will be examined first. In this case, the cyan coverage is 20% (color-separated data C_d=51), and the yellow coverage is 30% (color-separated data Y_d=76.5). At this time, the correction amount h1 for each scanning data of yellow is h1=C_d=51 from equation (16), and the color-separated data Y_d=76.5 is increased by h1=51. Thus, the cyan scanning data has a range of 0 to 51, and the yellow scanning data has a range of 51 to 127.5.

In "covering condition 2" 2702, the cyan coverage is 60% (color-separated data C_d=153), and the yellow coverage is 70% (color-separated data Y_d=178.5). At this time, the correction amount h1 for each scanning data of yellow is h1=255−Y_d=76.5 from equation (17), and the yellow color-separated data Y_d (sum of scanning data) is inverted. In this case, the cyan scanning data has a range of 0 to 51, and the yellow scanning data has a range of 76.5 to 255.

In "covering condition 3" 2703, the cyan coverage is 90% (color-separated data C_d=229.5), and the yellow coverage is 95% (color-separated image data Y_d=242.25). At this time, the correction amount h1 for each scanning data of yellow is h1=57.375 from equation (18). In this case, the cyan scanning data has a range of 0 to 229.5, and the yellow scanning data has a range of 57.3751 to 299.625. For yellow, the range exceeds the upper limit value of 255.

"Covering Condition 1"

Figure 12A:
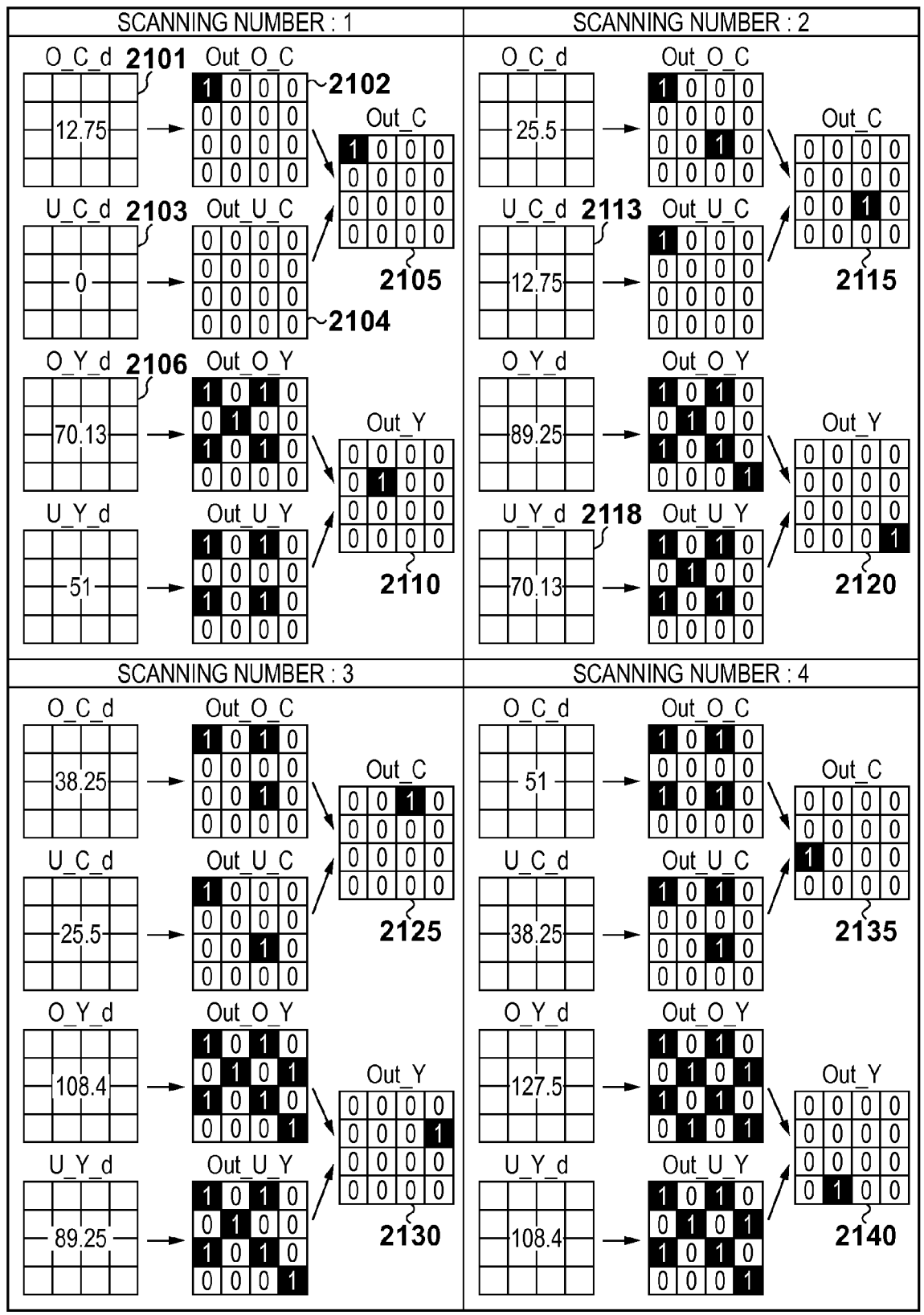
Figure 12B:
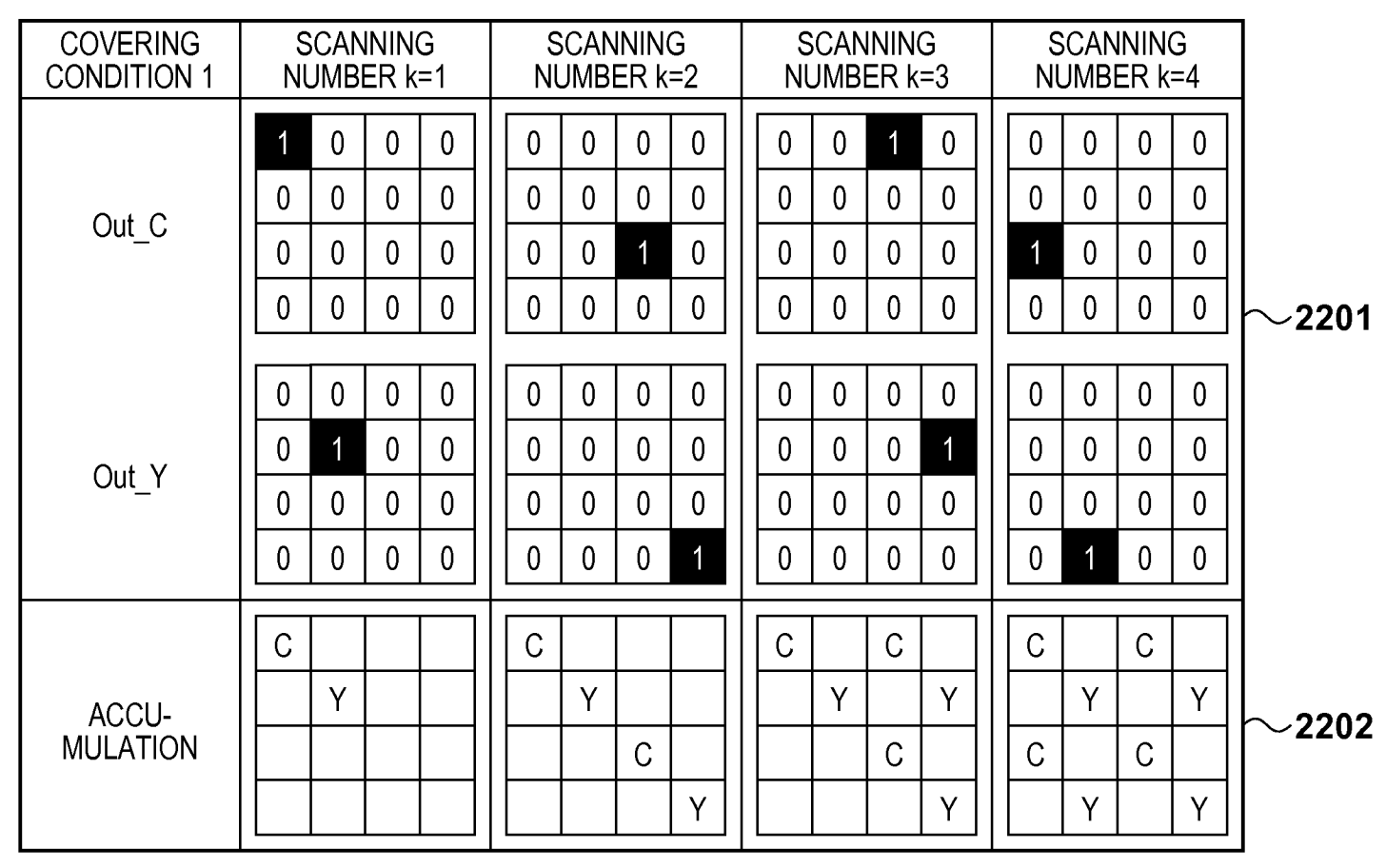

FIGS. 12A and 12B are views showing a calculation process and calculation results in halftone processing for "covering condition 1" shown in FIG. 11. In FIG. 12A, for cyan, cyan upper halftone image data Out_O_C 2102 is calculated first based on cyan upper scanning data O_C_d 2101 of scanning number 1. Note that a value "12.75" in the cyan upper scanning data O_C_d 2101 means that all 16 pixels forming the cyan upper scanning data O_C_d 2101 uniformly have the value "12.75". Also, cyan lower halftone image data Out_U_C 2104 is calculated based on cyan lower scanning data U_C_d 2103 of scanning number 1. As a result, cyan halftone image data Out_C 2105 is obtained in accordance with equation (22) described above. As for yellow, yellow halftone image data Out_Y 2110 is similarly obtained. For scanning numbers 2, 3, and 4, cyan halftone image data Out_C 2115, 2125, and 2135, and yellow halftone image data Out_Y 2120, 2130, and 2140 are obtained by the same procedures. As is apparent from Out_C 2105 and OUT_Y 2110, if both the upper and lower calculation targets are ON or OFF, the calculation result becomes OFF in accordance with equations (22) and (23). If the upper calculation target is ON and the lower one is OFF, the calculation result becomes ON. A case in which the upper calculation target is OFF and the lower one is ON does not occur.

When attention is paid to these processing results and the threshold matrix Th_1 shown in FIG. 9B, dots in Out_C and Out_Y in each scan become ON in threshold matrix regions having thresholds larger than lower scanning data and equal to or smaller than upper scanning data. The obtained upper scanning data O_C_d and O_Y_d serve as lower scanning data U_C_d and U_Y_d in the next scan. For example, the upper scanning data O_C_d 2101 and O_Y_d 2106 of scanning number 1 shown in FIG. 12A serve as lower scanning data U_C_d 2113 and U_Y_d 2118 of scanning number 2.

Since scanning data ranges do not overlap each other between different scanning numbers, superimposition of a dot in a region where a dot has been printed by a preceding scan can be prevented when the same threshold matrix is used. Thus, for example, cyan dots do not overlap each other in an image formed by four scans in the same region on a printing medium. Since upper scanning data and lower scanning data corresponding to each scanning number are quantized using a dot dispersion threshold matrix, an image with good graininess in which dots are dispersed in every scan can be formed. This also applies to yellow dots. Further, scanning data ranges do not overlap each other between cyan and yellow and between respective scans. For this reason, yellow and cyan dots do not overlap each other.

FIG. 12B exemplifies a dot pattern finally obtained by the calculation shown in FIG. 12A. In FIG. 12B, reference numeral 2201 denotes cyan halftone image data Out_C and yellow halftone image data Out_Y at each scanning number, which are also shown in FIG. 12A. Reference numeral 2202 denotes a result of accumulating cyan and yellow dots formed by the target scanning number. The accumulated dot pattern 2202 reveals that in "covering condition 1", cyan dots and yellow dots do not overlap each other even if an image is formed by a plurality of scans, as described above. Further, dispersibility is good for the dot pattern 2201 printed by respective scans and the accumulated dot pattern 2202 during main scanning formation.

"Covering Condition 2"

Figure 13A:
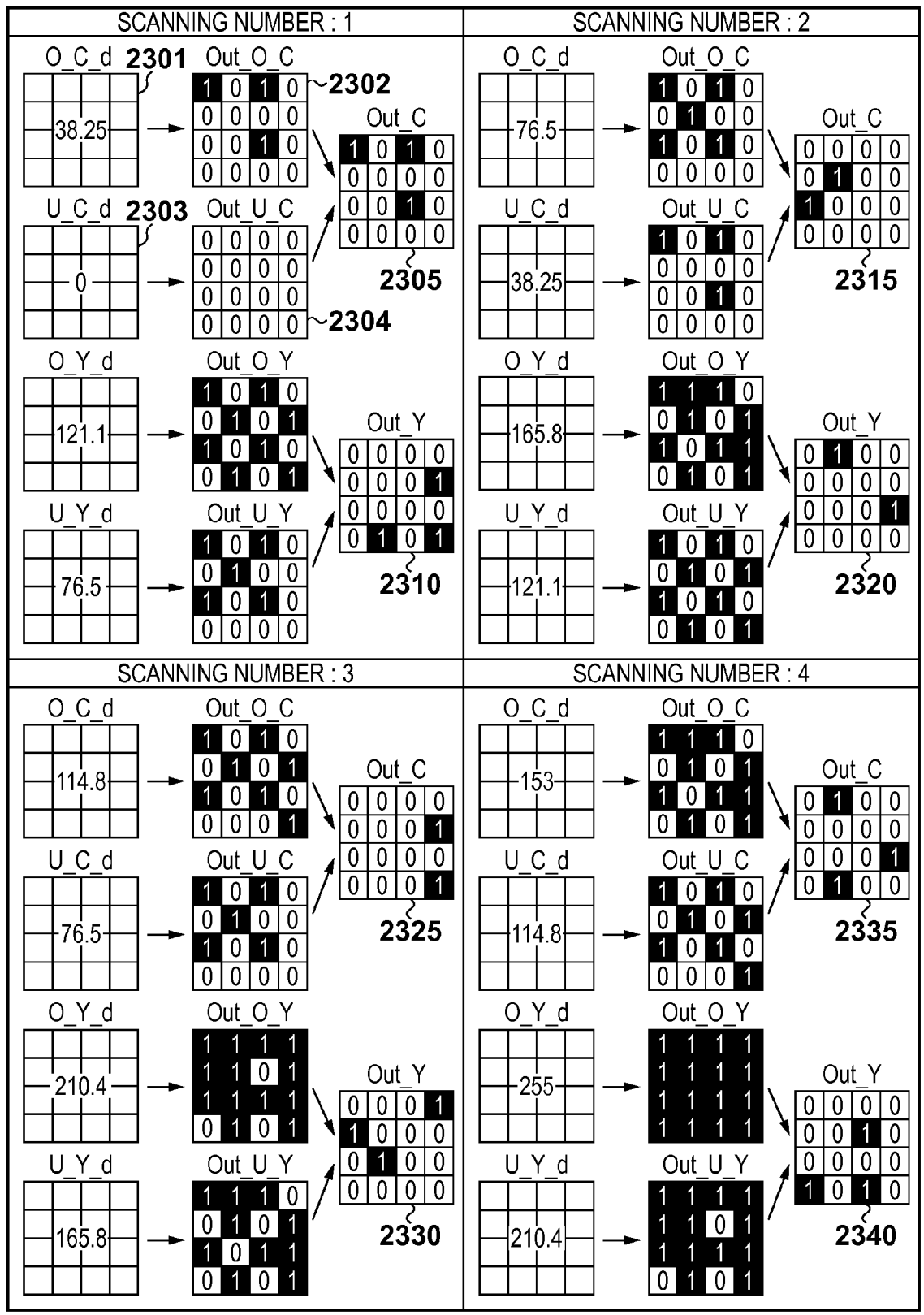
Figure 13B:
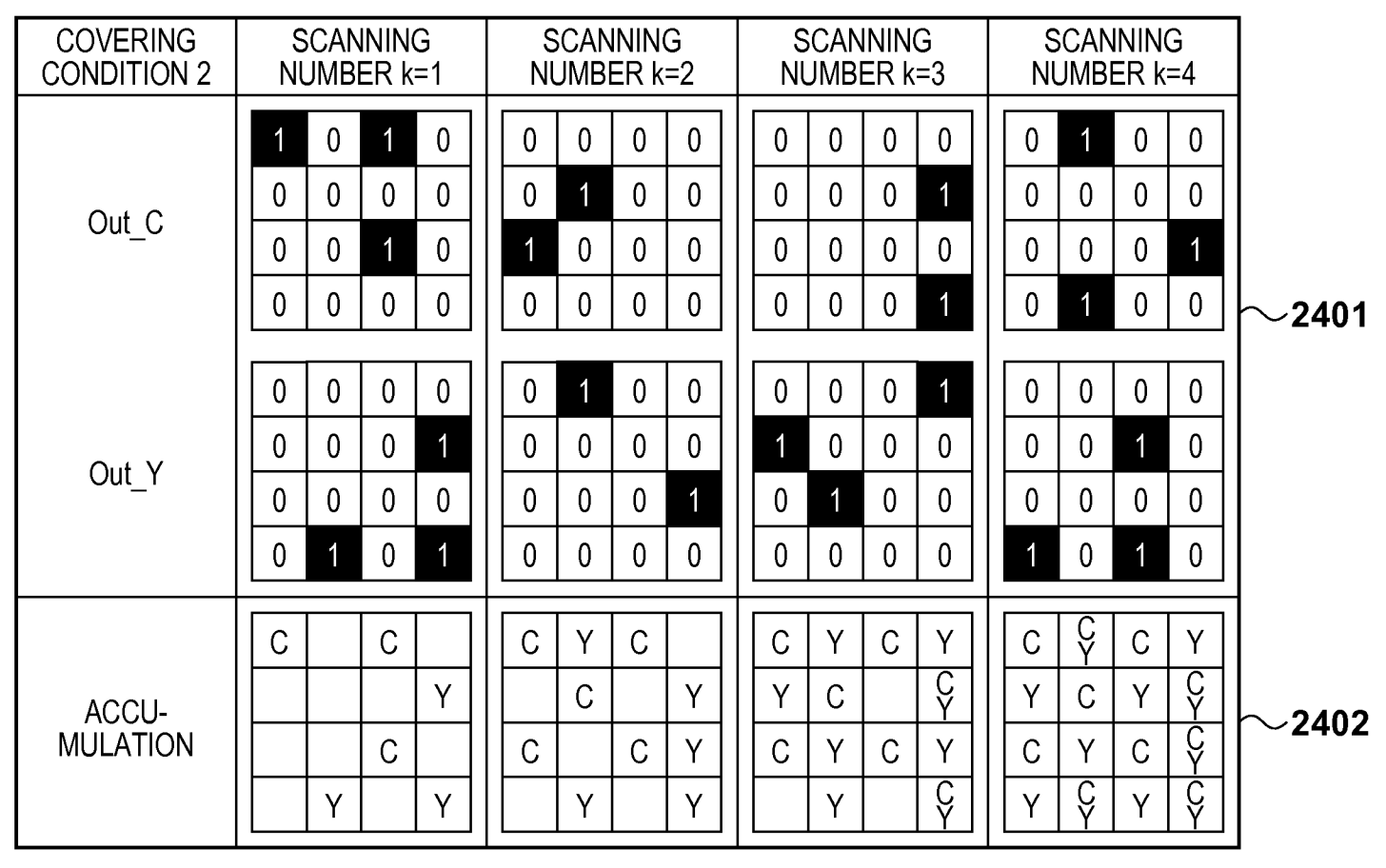

FIGS. 13A and 13B are views showing a calculation process and calculation results in halftone processing for "covering condition 2" shown in FIG. 11. In FIG. 13A, for cyan, cyan upper halftone image data Out_O_C 2302 is calculated first based on cyan upper scanning data O_C_d 2301 of scanning number 1. Also, cyan lower halftone image data Out_U_C 2304 is calculated based on cyan lower scanning data U_C_d 2303 of scanning number 1. As a result, cyan halftone image data Out_C 2305 is obtained in accordance with equation (22) described above. As for yellow, yellow halftone image data Out_Y 2310 is obtained by the same procedures. For scanning numbers 2, 3, and 4, cyan halftone image data Out_C 2315, 2325, and 2335, and yellow halftone image data Out_Y 2320, 2330, and 2340 are obtained.

From these processing results, dots in Out_C and Out_Y in each scan become ON in threshold matrix regions having thresholds larger than lower scanning data and equal to or smaller than upper scanning data, similar to the case of "covering condition 1". The obtained upper scanning data O_C_d and O_Y_d serve as lower scanning data U_C_d and U_Y_d in the next scan. Thus, the ranges of lower scanning data and upper scanning data at each scanning number do not overlap each other between scanning numbers. For example, Out_C and Out_Y are formed so that the dot does not become ON at the same position in scans of scanning numbers 1 to 4 as much as possible.

FIG. 13B exemplifies a dot pattern finally obtained by the calculation shown in FIG. 13A. In FIG. 13B, reference numeral 2401 denotes cyan halftone image data Out_C and yellow halftone image data Out_Y of each scanning number, which are also shown in FIG. 13A. Reference numeral 2402 denotes a result of accumulating cyan and yellow dots formed by the target scanning number. In 2402, a square in which C and Y are vertically aligned indicates a dot in which cyan serves as an upper layer, yellow serves as a lower layer, and they overlap each other. According to the accumulated dot pattern 2402, in "covering condition 2", cyan always serves as an upper layer and yellow always serves as a lower layer in a region where cyan and yellow dot data overlap each other. In addition, dispersibility is good for the dot pattern 2401 in main scanning and the accumulated dot pattern 2402 during main scanning formation.

"Covering Condition 3"

Figure 14A:
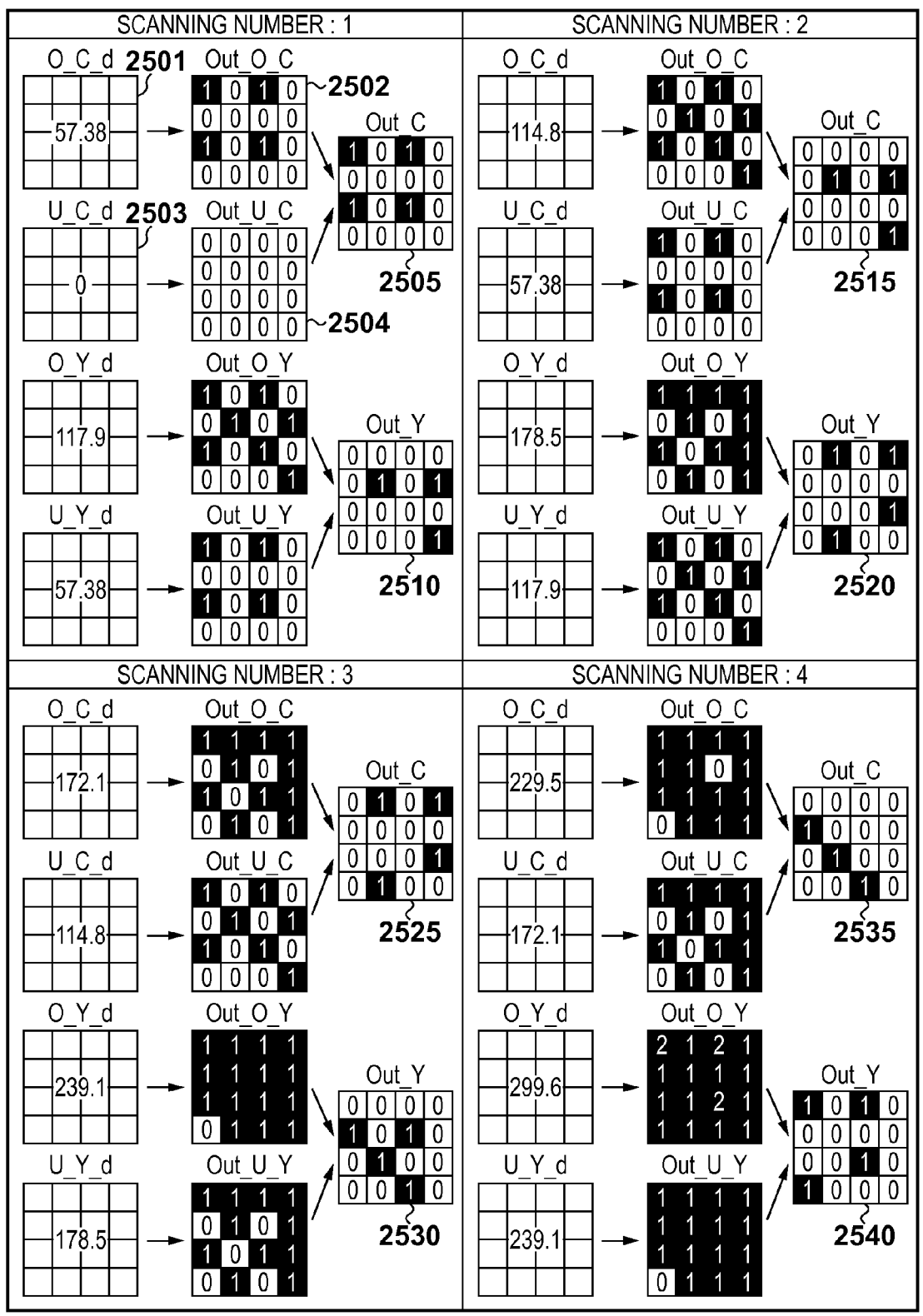
Figure 14B:
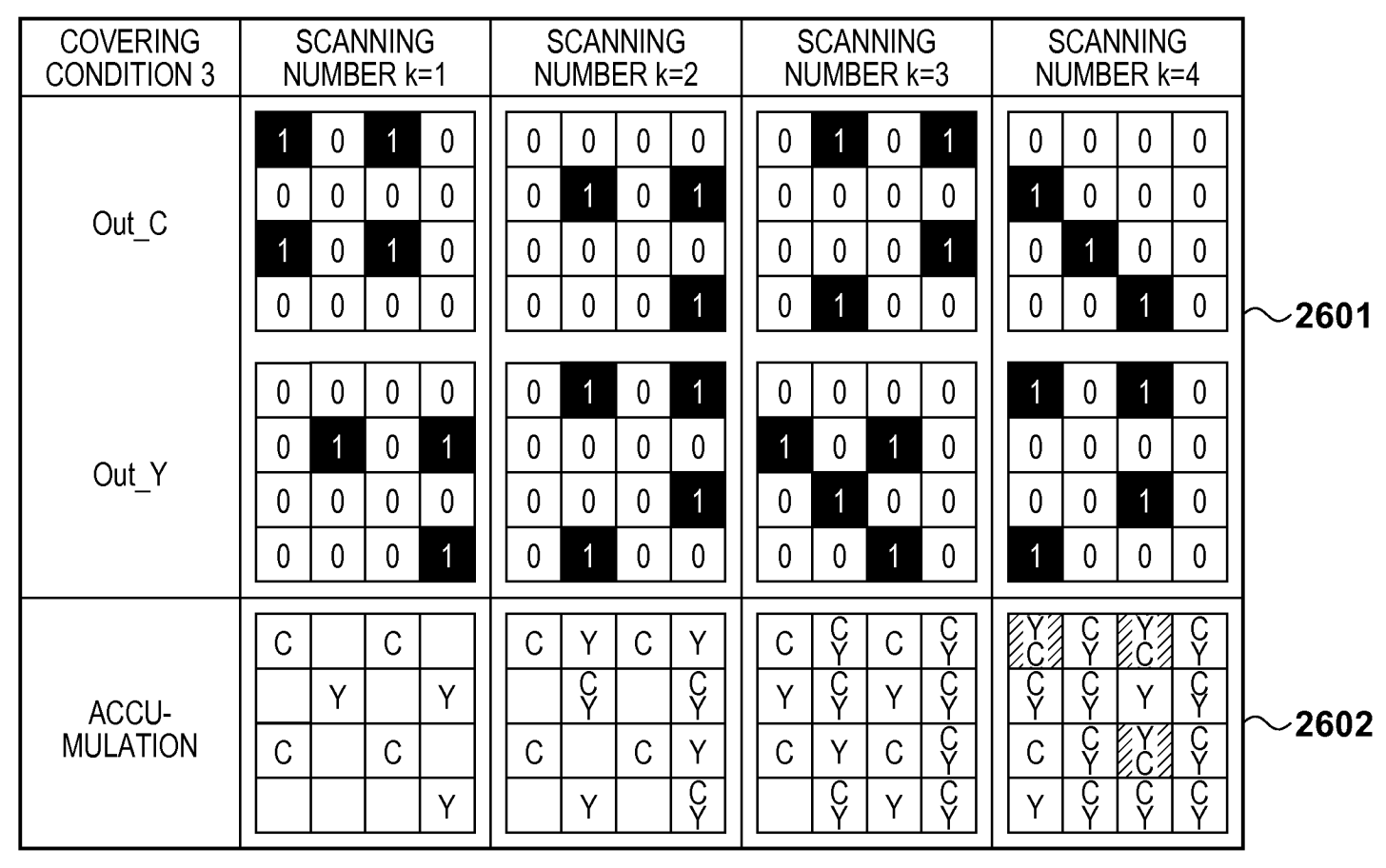

FIGS. 14A and 14B are views showing a calculation process and calculation results in halftone processing for "covering condition 3" shown in FIG. 11. In FIG. 14A, for cyan, cyan upper halftone image data Out_O_C 2502 is calculated first based on cyan upper scanning data O_C_d 2501 of scanning number 1. Also, cyan lower halftone image data Out_U_C 2504 is calculated based on cyan lower scanning data U_C_d 2503 of scanning number 1. As a result, cyan halftone image data Out_C 2505 is obtained in accordance with equation (22) described above. As for yellow, yellow halftone image data Out_Y 2510 is obtained by the same procedures. For scanning numbers 2, 3, and 4, cyan halftone image data Out_C 2515, 2525, and 2535, and yellow halftone image data Out_Y 2520, 2530, and 2540 are obtained.

From these processing results, dots in Out_C and Out_Y become ON in threshold matrix regions having thresholds larger than lower scanning data and equal to or smaller than upper scanning data, similar to the cases of "covering condition 1" and "covering condition 2". The obtained upper scanning data O_C_d and O_Y_d serve as lower scanning data U_C_d and U_Y_d in the next scan. Thus, the ranges of lower scanning data and upper scanning data of each scanning number do not overlap each other between scanning numbers. Out_C and Out_Y are formed so that the dot does not become ON at the same position in scans of scanning numbers 1 to 4 as much as possible.

FIG. 14B exemplifies a dot pattern finally obtained by the calculation shown in FIG. 14A. In FIG. 14B, reference numeral 2601 denotes cyan halftone image data Out_C and yellow halftone image data Out_Y of each scanning number, which are also shown in FIG. 14A. Reference numeral 2602 denotes a result of accumulating cyan and yellow dots formed by the target scanning number. In 2602, a square in which both C and Y are described indicates a dot in which a color described above in the square serves as an upper layer, a color described below serves as a lower layer, and they overlap each other. According to the accumulated dot pattern 2602, in "covering condition 3", regions where cyan and yellow dot data overlap each other are 13 squares out of 16 squares. In 10 squares out of the 13 squares, cyan serves as an upper layer and yellow serves as a lower layer. In three squares out of the 13 squares where overlapping occurs, yellow serves as an upper layer, cyan serves as a lower layer, and the superimposition relationship is reversed. However, the superimposition relationship is reversed (yellow serves as an upper layer and cyan serves as a lower layer) in very few regions, and these regions are dispersedly arranged and hardly visually recognized. Further, dispersibility is good for the dot pattern 2601 in main scanning and the accumulated dot pattern 2602 during main scanning formation. In the formation process of accumulated dot data C and Y in the accumulated dot pattern 2602, dots of each color are dispersed as much as possible within the limitation of 4×4 squares.

Modification

The embodiment has explained an example of performing uniform division processing at an ink value division ratio of 0.25 for each nozzle, as shown in FIG. 6A. However, uniform division sometimes makes a streak stand out in a formed image owing to a paper misfeed or the like. The generation of a streak can be suppressed by setting a high ink division ratio at the nozzle center portion, as shown in FIG. 15A. Even if the ink value division ratio is changed, the embodiment can perform superimposition control of cyan and yellow in the above-described way.

Figure 15B:
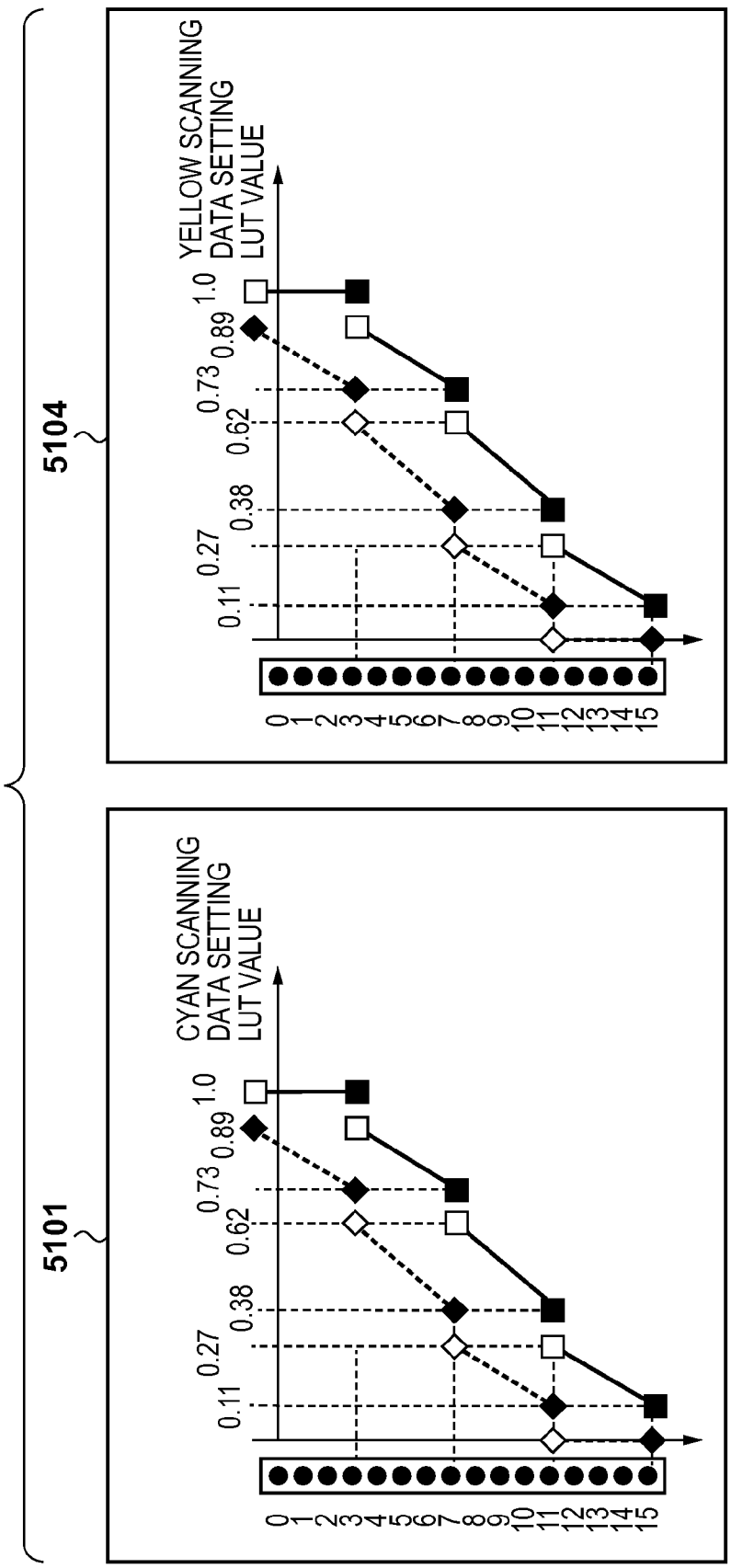
Figure 15C:
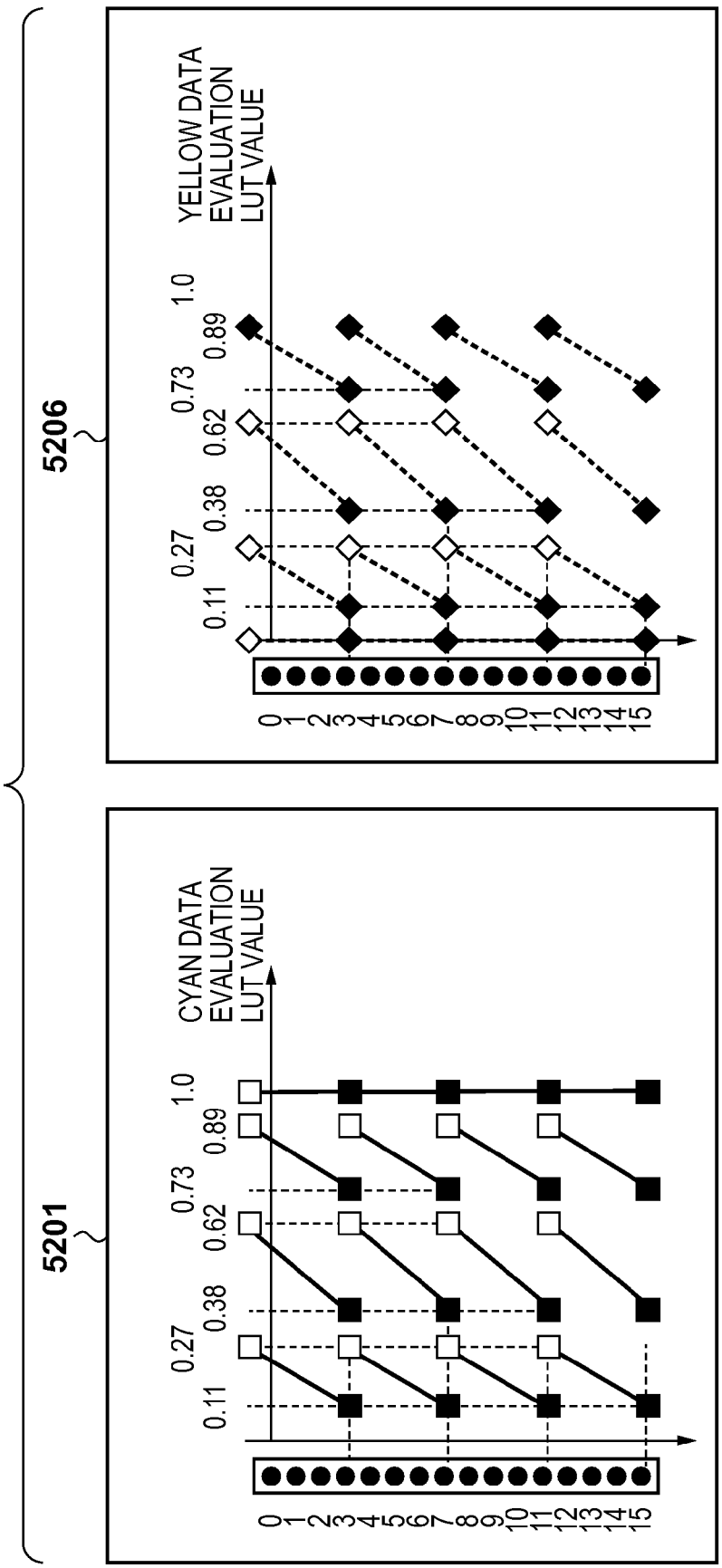

In this case, the relationship between the nozzle position and the scanning data set value is set in the scanning data setting LUT 106, as represented by reference numerals 5101 and 5104 in FIG. 15B, similar to FIG. 6B. Also, the relationship between the nozzle position and the scanning data set value is set in the scanning data evaluation correction LUT 107, as represented by 5201 and 5206 in FIG. 15C, similar to FIG. 6C. By using the scanning data setting LUT 106 and scanning data evaluation correction LUT 107, superimposition control is executed in scanning data setting for cyan and yellow, similar to the first embodiment. That is, in a region where cyan and yellow overlap each other, yellow and cyan serve as lower and upper layers, respectively. In addition, it is controlled to improve the dispersibility of a dot pattern in main scanning and an accumulated dot pattern during main scanning formation.

Effects of First Embodiment

As described above, according to the first embodiment, a correction amount corresponding to cyan and yellow pixel values is added to image data of yellow to be printed as a lower layer, and image data of each color is divided into upper data and lower data. Halftone processing is performed for the upper data and lower data in each pass in which the ranges of image data of the two colors are divided into a plurality of ranges. The resultant upper data and lower data are composited. While controlling the upper layer/lower layer superimposition relationship between cyan and yellow, the dispersibility of a dot pattern in main scanning and an accumulated dot pattern during formation can be improved. While suppressing color unevenness and gloss unevenness, an increase in graininess and a thin streak arising from misregistration between main scans and the interaction between inks can be reduced.

Note that the embodiment has described superimposition control for two, cyan and yellow. However, superimposition control can be similarly performed for a combination of other colors.

Second Embodiment

The second embodiment according to the present invention will be described. In the first embodiment, the ink division ratio is set as shown in FIG. 6A or 15A to perform cyan/yellow superimposition control. However, in the first embodiment, dots cannot be arranged so that cyan always serves as an upper layer and yellow always serves as a lower layer. At a high-coverage portion ("covering condition 3"), cyan serves as a lower layer and yellow serves as an upper layer in some dots. This is because ink value division ratios are set to be vertically symmetrical for the nozzles of the printhead in the first embodiment. In the second embodiment, ink value division ratios for the nozzle array are distributed to be vertically asymmetrical. It can therefore be controlled that cyan always serves as an upper layer and yellow always serves as a lower layer.

The second embodiment is different from the first embodiment in only the setting of the ink division ratio. Hence, a description of the same arrangement and processing as those in the first embodiment will not be repeated. To simplify the description, the second embodiment also exemplifies two, C (Cyan) and Y (Yellow) in 4-pass printing.

Setting of Ink Value Division Ratio

FIG. 16A exemplifies the ink value division ratio in the second embodiment. In the example of FIG. 16A, the division ratio D_C_d(ny) of cyan color-separated image data is set to D_C_d(3)=D_C_d(7)=D_C_d(11)=0.333, and D_C_d(15)= 0.0. The division ratio D_Y_d(ny3) of yellow color-separated image data is set to D_Y_d(3)=0.0, and D_Y_d(7)= D_Y_d(11)=D_Y_d(15)=0.333. In this case, the cyan and yellow ink value division ratios D_C_d and D_Y_d have the following characteristics:

For $0 \leq ny < 12, D\_C\_d(ny) = 0.333$

For $12 \leq ny < 16, D\_C\_d(ny) = 0.0$ (24)

For $0 \leq ny < 4, D\_Y\_d(ny) = 0.0$

For $4 \leq ny < 16, D\_Y\_d(ny) = 0.333$ (25)

Scanning Data Setting LUT

Figure 16B:
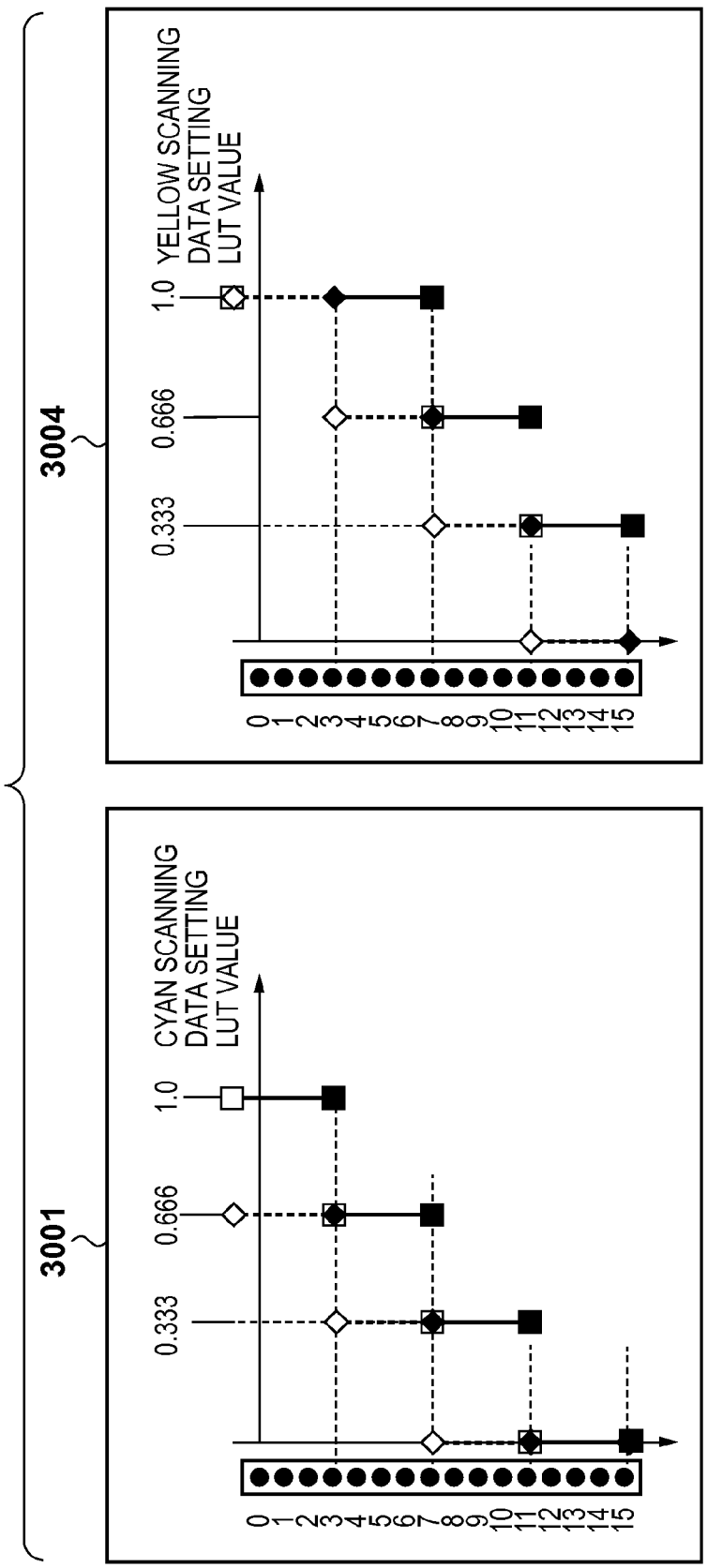

When the ink value division ratios (FIG. 16A) given by equations (24) and (25) are set for cyan and yellow, a scanning data setting LUT 106 is set as represented by reference numerals 3001 and 3004 in FIG. 16B for cyan and yellow, respectively. In FIG. 16B, similar to FIG. 6B in the first embodiment, two LUTs, that is, a lower LUT indicated by dotted lines and an upper LUT indicated by solid lines are set as each of the scanning data setting LUTs 3001 and 3004. The lower LUT is data indicated by dotted lines each having white and black rhombus symbols at two ends, and represents a table for generating lower scanning data. The upper LUT is data indicated by solid lines each having white and black quadrate symbols at two ends, and represents a table for generating upper scanning data.

A lower LUT U_C_LUT(ny) and upper LUT O_C_LUT(ny) for cyan are generated using the division ratios of cyan scanning data shown in FIG. 16A in accordance with equations (4) and (5), similar to the first embodiment. As a result, the scanning data setting LUT 3001 shown in FIG. 16B is obtained. The U_C_LUT and O_C_LUT values in the second embodiment are as follows:

For $0 \leq ny < 4, U\_C\_LUT(ny) = 0.666, O\_C\_LUT(ny) = 1.0$

For $4 \leq ny < 8, U\_C\_LUT(ny) = 0.333, O\_C\_LUT(ny) = 0.666$

For $8 \leq ny < 12, U\_C\_LUT(ny) = 0.0, O\_C\_LUT(ny) = 0.333$

For $12 \leq ny < 16, U\_C\_LUT(ny) = 0.0, O\_C\_LUT(ny) = 0.0$ (26)

As for yellow, U_Y_LUT(ny) and O_Y_LUT(ny) are calculated as follows:

For $0 \leq ny < 4, U\_Y\_LUT(ny) = 1.0, O\_Y\_LUT(ny) = 1.0$

For $4 \leq ny < 8, U\_Y\_LUT(ny) = 0.666, O\_Y\_LUT(ny) = 1.0$

For $8 \leq ny < 12, U\_Y\_LUT(ny) = 0.333, O\_Y\_LUT(ny) = 0.666$

For $12 \leq ny < 16, U\_Y\_LUT(ny) = 0.0, O\_Y\_LUT(ny) = 0.333$ (27)

Scanning Data Evaluation Correction LUT

Figure 16C:
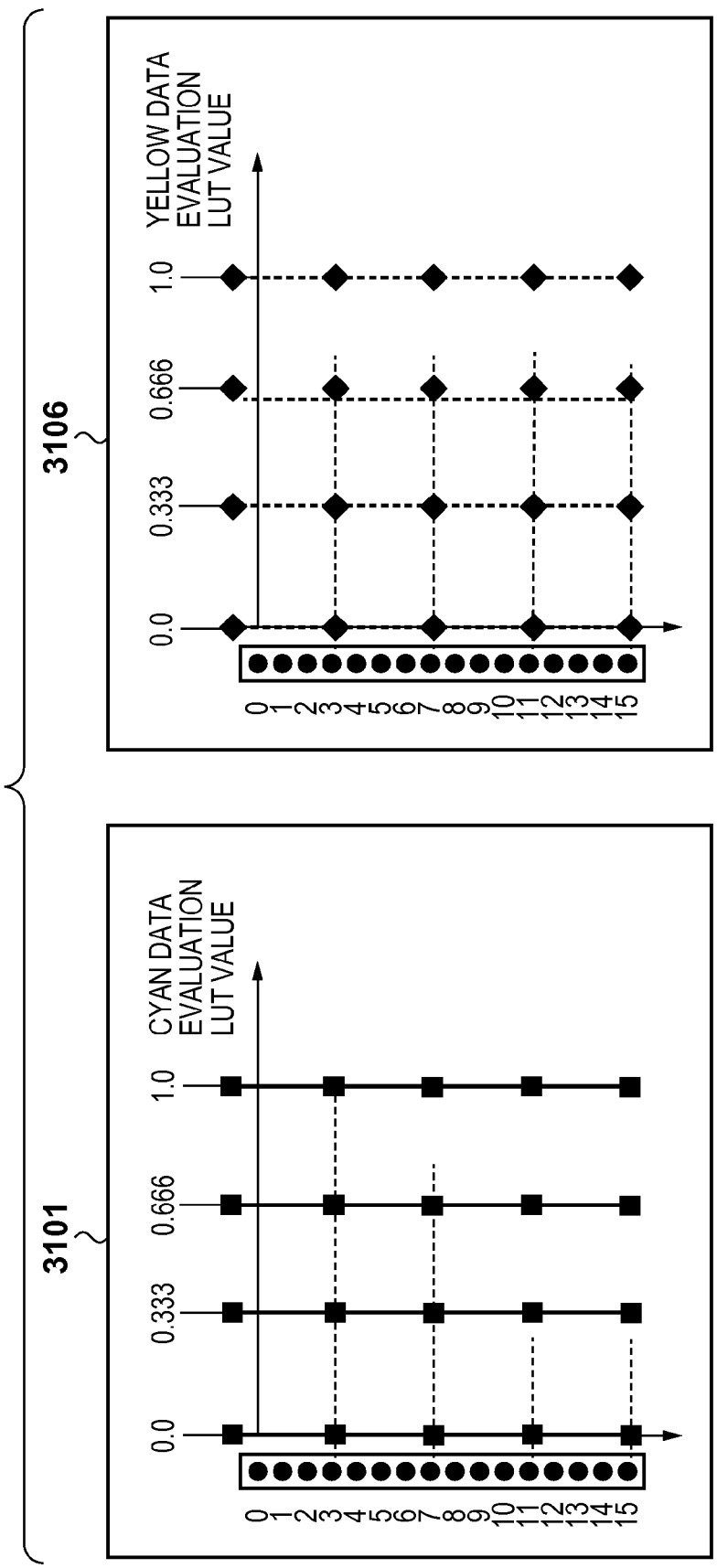

When the ink value division ratios (FIG. 16A) given by equations (24) and (25) are set for cyan and yellow, a scanning data evaluation correction LUT 107 is set as represented by reference numerals 3101 and 3106 in FIG. 16C for cyan and yellow, respectively. In FIG. 16C, similar to FIG. 6C in the first embodiment, the LUT 3101 is a cyan scanning data evaluation correction LUT, and is used to evaluate cyan (upper layer) scanning data. The LUT 3106 is a yellow scanning data evaluation correction LUT, and is used to evaluate yellow (lower layer) scanning data. Also in the second embodiment, scanning data of yellow to be set on a lower layer is corrected using the cyan scanning data evaluation correction LUT 3101 and yellow scanning data evaluation correction LUT 3106.

The scanning data evaluation correction LUT 107 shown in FIG. 16C is generated according to equations (7) and (9), similar to the first embodiment. The set values of the cyan scanning data evaluation correction LUT 3101 and yellow scanning data evaluation correction LUT 3106 in the second embodiment are as follows:

$H1\_C\_1\_LUT(ny) = 0.0$ $H1\_C\_2\_LUT(ny) = 0.333$ $H1\_C\_3\_LUT(ny)=0.666$ $H1\_C\_4\_LUT(ny)=1.0$ $H1\_Y\_1\_LUT(ny)=0.0$ $H1\_Y\_2\_LUT(ny)=0.333$ $H1\_Y\_3\_LUT(ny)=0.666$ (28)

$H1\_Y\_4\_LUT(ny)=1.0$ (29)

In the second embodiment, vertically asymmetrical ink value division ratios are assigned to the nozzle array, and the scanning data setting LUT 106 and scanning data evaluation correction LUT 107 are prepared. Even at a high-coverage portion, dots can be formed so that cyan always serves as an upper layer and yellow always serves as a lower layer. In the first embodiment described above, cyan serves as a lower layer and yellow serves as an upper layer in some dots in "covering condition 3". Considering this, "covering condition 3" is prevented by using ink value division ratios as shown in FIG. 16A. That is, "covering condition 2" is always satisfied at a high-coverage portion, so it is controlled that cyan serves as an upper layer and yellow serves as a lower layer in all dots.

Third Embodiment

In the first and second embodiments described above, the ink value division ratio is statically set, and it is controlled that cyan serves as an upper layer and yellow serves as a lower layer. The third embodiment will describe an example in which the ink value division ratio is dynamically controlled. A description of the same arrangement and processing as those in the first embodiment will not be repeated. To simplify the description, the third embodiment also exemplifies two, C (Cyan) and Y (Yellow) in 4-pass printing. All the division ratios D_M_d, D_K_d, D_Lc_d, and D_Lm_d of the four remaining colors M, K, Lc, and Lm are statically set to 0.25, similar to the first embodiment.

In the third embodiment, the initial value of the cyan ink value division ratio is set to D_C_d(3)=D_C_d(7)=D_C_d(11)=D_C_d(15)=0.25 shown in FIG. 6A in the first embodiment. Similarly, the initial value of the yellow ink value division ratio is set to D_Y_d(3)=D_Y_d(7)=D_Y_d(11)=D_Y_d(15)=0.25.

Scanning Data Setting Flowchart

Processing by a scanning data setting unit 105 using a scanning data setting LUT 106 and scanning data evaluation correction LUT 107 in the third embodiment will be explained with reference to the flowchart of FIG. 17.

Figure 17:
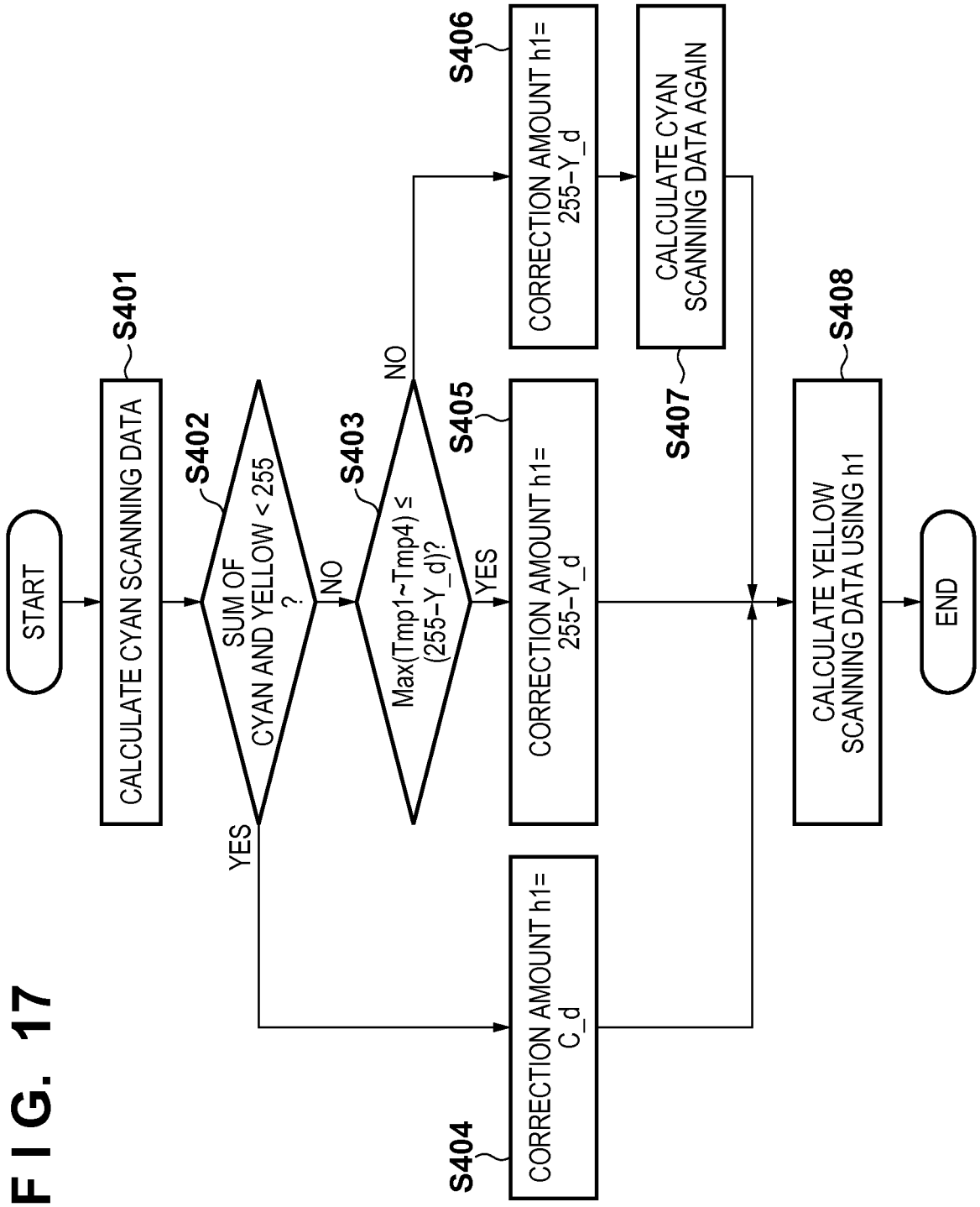
FIG. 17 is a flowchart showing scanning data setting processing in the third embodiment.

In the third embodiment, processes in steps S401 to S405 of FIG. 17 are the same as those in steps S201 to S205 of FIG. 7 in the first embodiment, and a description thereof will not be repeated. In the third embodiment, when "covering condition 3" is satisfied, the correction amount h1 is calculated in step S406, and cyan scanning data is calculated again in step S407.

In FIG. 17, if equation (15) described above is satisfied in step S403, it is determined that "covering condition 3" is satisfied, the process advances to step S406, and the yellow data correction amount is calculated in accordance with equation (17) described above. That is, the yellow correction value h1 is given by 255−Y_d.

In step S407, cyan scanning data is dynamically set again. At this time, the cyan ink value division ratio is set again according to equations (30):

For $0 \le ny<12, D\_C\_d(ny)=\{1.0-(255-Y\_d)/C\_d\}/3$

For $12 \le ny<16, D\_C\_d(ny)=(255-Y\_d)/C\_d$ (30)

For example, when C_d=229.5 and Y_d=242.25 are given as represented by "covering condition 3" 1403 shown in FIG. 5, D_C_d is set again as shown on the left side of FIG. 18A according to equations (31):

For $0 \le ny<12, D\_C\_d(ny)=0.3148$

For $12 \le ny<16, D\_C\_d(ny)=0.055$ (31)

Figure 18B:
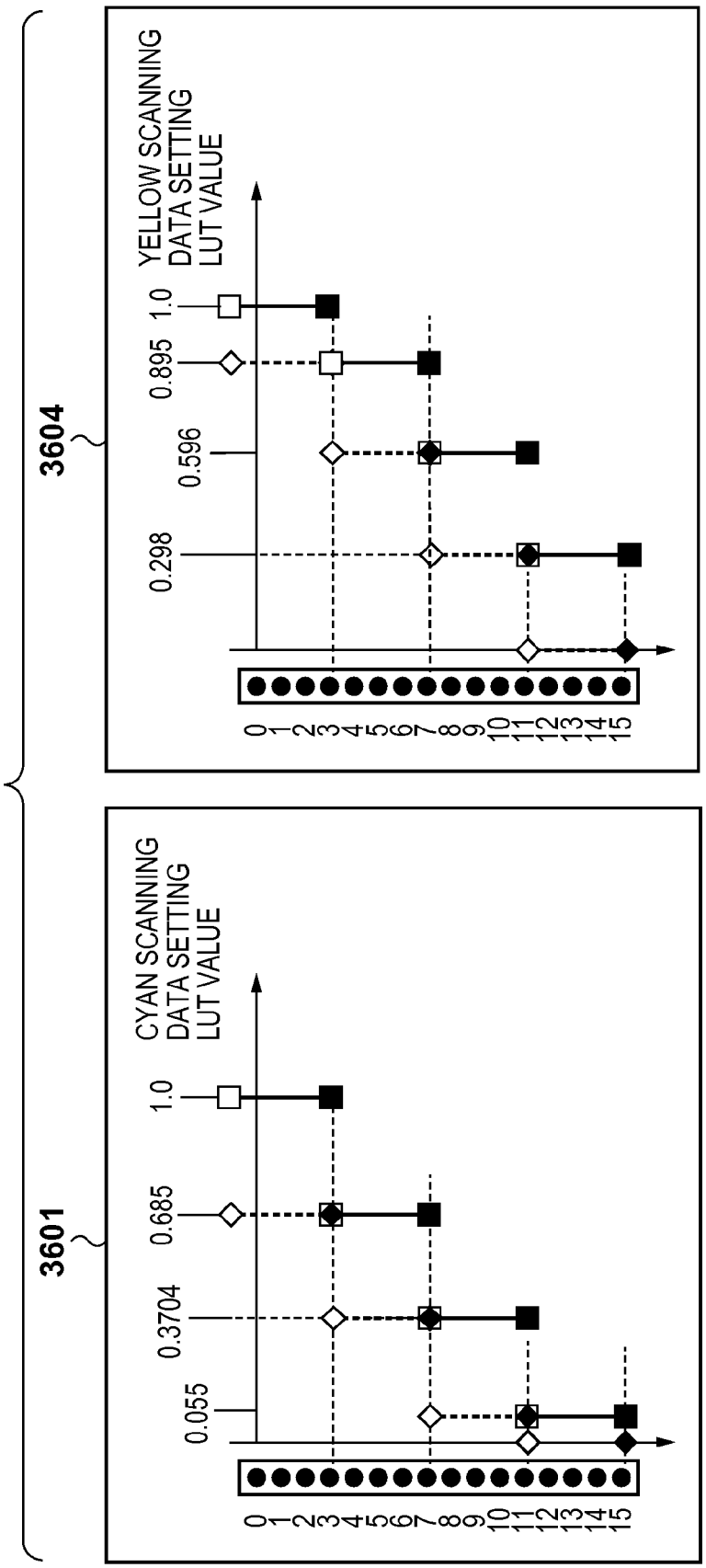

If the ink value division ratio as shown in FIG. 18A is set again for cyan in accordance with equations (31) in step S407, the scanning data setting LUT 106 is also dynamically set again as represented by reference numeral 3601 in FIG. 18B. Reference numeral 3601 denotes a re-set cyan scanning data setting LUT. Two LUTs, that is, a lower LUT indicated by dotted lines and an upper LUT indicated by solid lines are set. U_C_LUT(ny) and O_C_LUT(ny) in the re-set cyan scanning data setting LUT 3601 shown in FIG. 18B are generated according to the following rules:

$U\_C\_LUT(ny)=D\_C\_d(ny+Nzzl/4)+D\_C\_d(ny+2 \times Nzzl/4)+D\_C\_d(ny+3 \times Nzzl/4)$ $O\_C\_LUT(ny)=D\_C\_d(ny)+D\_C\_d(ny+Nzzl/4)+D\_C\_d(ny+2 \times Nzzl/4)+D\_C\_d(ny+3 \times Nzzl/4)$ (32)

The re-set U_C_LUT and O_C_LUT values are as follows:

For $0 \le ny<4, U\_C\_LUT(ny)=0.685, O\_C\_LUT(ny)=1.0$

For $4 \le ny<8, U\_C\_LUT(ny)=0.3704, O\_C\_LUT(ny)=0.685$

For $8 \le ny<12, U\_C\_LUT(ny)=0.055, O\_C\_LUT(ny)=0.3704$

For $12 \le ny<16, U\_C\_LUT(ny)=0.0, O\_C\_LUT(ny)=0.055$ (33)

As for the scanning data evaluation correction LUT 107, when an ink value division ratio as shown in FIG. 18A is set again, the scanning data evaluation correction LUT 107 is dynamically set again as represented by 3701 in FIG. 18C. The re-set cyan scanning data evaluation correction LUT 3701 shown in FIG. 18C is generated according to the following rules:

$H2\_C\_1\_LUT(ny)=D\_C\_d(ny+3 \times Nzzl/4)$ $H2\_C\_2\_LUT(ny)=D\_C\_d(ny+3 \times Nzzl/4)+D\_C\_d(ny+2 \times Nzzl/4)$ $H2\_C\_3\_LUT(ny)=D\_C\_d(ny+3 \times Nzzl/4)+D\_C\_d(ny+2 \times Nzzl/4)+D\_C\_d(ny+Nzzl/4)$ $H2\_C\_4\_LUT(ny)=D\_C\_d(ny+3 \times Nzzl/4)+D\_C\_d(ny+2 \times Nzzl/4)+D\_C\_d(ny+Nzzl/4)+D\_C\_d(ny)$ (34)

The above equations represent a case in which the nozzle position satisfies $0 \le ny<4$. For the fourth and subsequent nozzles, values set for the ($0 \le ny<4$)th nozzles are repetitively applied.

After cyan scanning data is set again in step S407, that is, the cyan ink value division ratio, the scanning data setting LUT 106, and the scanning data evaluation correction LUT 107 are set again, yellow scanning data is calculated in step S408. More specifically, the yellow ink value division ratio D_Y_d is set again. This re-setting uses reference values Tmp_Y1 to Tmp_Y3 calculated according to the following equations:

$$Tmp\_Y1 = C\_d(nx, ny+Ycut(k)) \times H2\_C\_LUT\_2(ny) - Y\_d(nx, ny+Ycut(k)) \times 0.25 - h1$$

$$Tmp\_Y2 = C\_d(nx, ny+Ycut(k)) \times H2\_C\_LUT\_3(ny) - Y\_d(nx, ny+Ycut(k)) \times 0.5 - h1$$

$$Tmp\_Y3 = C\_d(nx, ny+Ycut(k)) \times H2\_C\_LUT\_4(ny) - Y\_d(nx, ny+Ycut(k)) \times 0.75 - h1 \quad (35)$$

The reference values Tmp_Y1 to Tmp_Y3 are obtained by correcting cyan and yellow pixel values in color-separated image data using the scanning data evaluation correction LUT and correction amount h1, and calculating the difference between these colors for each nozzle position ny of 0≤ny<4. The correction amount h1 is calculated similarly to the first embodiment, and h1=12.75 here.

In the D_C_d re-setting example for C_d=229.5 and Y_d=242.25, the reference values Tmp_Y1 to Tmp_Y3 are as follows:

$$Tmp\_Y1 = 11.69, Tmp\_Y2 = 22.30, Tmp\_Y3 = 35.0625 \quad (36)$$

By using Tmp_Y1 to Tmp_Y3, the re-set D_Y_d is determined according to the following rules:

For 12≤ny<16, if(Tmp_Y1>0){D_Y_d(ny)={C_d−(255−Y_d)}/Y_d/3} else {D_Y_d(ny)=0.25}

For 8≤ny<12, if(Tmp_Y2>0){D_Y_d(ny)={C_d−(255−Y_d)}/Y_d/3} else {D_Y_d(ny)=0.25}

For 4≤ny<8, if(Tmp_Y3>0){D_Y_d(ny)={C_d−(255−Y_d)}/Y_d/3} else {D_Y_d(ny)=0.25}

For 0≤ny<4, D_Y_d(ny)=1.0−D_Y_d(ny+4)−D_Y_d(ny+8)−D_Y_d(ny+12) (37)

That is, in the D_C_d re-setting example, D_Y_d is set again as shown on the right side of FIG. 18A according to following equations:

For 4≤ny<16, D_Y_d(ny)=0.2982

For 0≤ny<4, D_Y_d(ny)=0.1054 (38)

If the yellow ink value division ratio D_Y_d is set again in the above manner, the scanning data setting LUT 106 is also dynamically set again as represented by reference numeral 3604 in FIG. 18B. Reference numeral 3604 denotes a re-set yellow scanning data setting LUT. Two LUTs, that is, a lower LUT indicated by dotted lines and an upper LUT indicated by solid lines are set. U_Y_LUT(ny) and O_Y_LUT(ny) in the re-set yellow scanning data setting LUT 3604 shown in FIG. 18B are generated according to the following rules:

U_Y_LUT(ny)=D_Y_d(ny+Nzzl/4)+D_Y_d(ny+2×Nzzl/4)+D_Y_d(ny+3×Nzzl/4)

O_Y_LUT(ny)=D_Y_d(ny)+D_Y_d(ny+Nzzl/4)+D_Y_d(ny+2×Nzzl/4)+D_Y_d(ny+3×Nzzl/4) (39)

The re-set U_Y_LUT and O_Y_LUT values are as follows:

For 0≤ny<4, U_Y_LUT(ny)=0.895, O_Y_LUT(ny)=1.0

For 4≤ny<8, U_Y_LUT(ny)=0.596, O_Y_LUT(ny)=0.895

For 8≤ny<12, U_Y_LUT(ny)=0.298, O_Y_LUT(ny)=0.596

For 12≤ny<16, U_Y_LUT(ny)=0.0, O_Y_LUT(ny)=0.298 (40)

Superimposition Control in Third Embodiment

Figure 19:
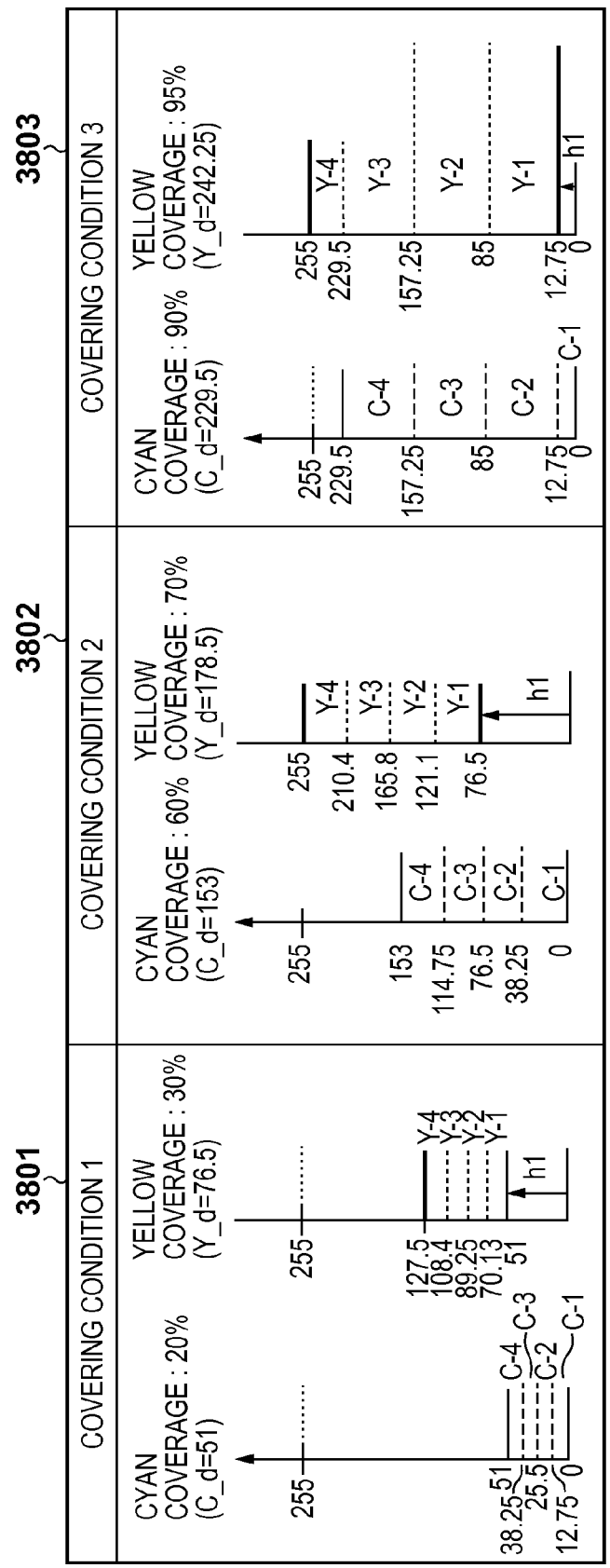
FIG. 19 is a view showing a scanning data range in the third embodiment.

Dynamic superimposition control in the third embodiment will be explained with reference to FIG. 19. FIG. 19 shows density ranges set as cyan and yellow scanning data in "covering condition 1" 3801, "covering condition 2" 3802, and "covering condition 3" 3803. The scanning data ranges in the "covering condition 1" 3801 and "covering condition 2" 3802 shown in FIG. 19 are the same as the ranges shown in FIG. 11 in the above-described first embodiment, and a description thereof will not be repeated.

Cyan scanning data 3810 in the "covering condition 3" 3803 represents the ranges of scanning data set for scanning numbers 1 to 4 for cyan color-separated data C_d=229.5. Yellow scanning data 3811 represents the ranges of scanning data set for scanning numbers 1 to 4 for yellow color-separated data Y_d=242.25. The yellow scanning data 3811 represents the ranges of scanning data corrected at h1=12.75 (3812).

As shown in FIG. 19, a dot formed in a scan of cyan scanning number 1 and a dot formed in a scan of yellow scanning number 1 in the "covering condition 3" 3803 do not become ON at the same position because their scanning data ranges do not overlap each other. However, the scanning data range (12.75 to 85) for cyan scanning number 2 and the scanning data range (12.75 to 85) for yellow scanning number 1 overlap each other, and dots at the same position become ON. That is, a dot formed in a scan of cyan scanning number 2 and a dot formed in a scan of yellow scanning number 1 overlap each other. In this case, the same data range is used for cyan and yellow, but a yellow dot is formed in a scan of scanning number 1, so the yellow dot becomes ON first. As for the remaining scanning numbers in the "covering condition 3" 3803, a yellow dot is always formed in a scan of a smaller scanning number. For this reason, a yellow dot is always printed as a layer lower than a cyan dot.

As described above, according to the third embodiment, the ink value division ratio is dynamically controlled at a high-coverage portion. Even at the high-coverage portion, it is controlled that cyan serves as an upper layer and yellow serves as a lower layer in all dots. Compared to the first embodiment, the third embodiment can further suppress color unevenness and gloss unevenness at a high-coverage portion, and reduce an increase in graininess and a thin streak arising from misregistration between main scans and the interaction between inks.

Other Embodiments

Figure 20:
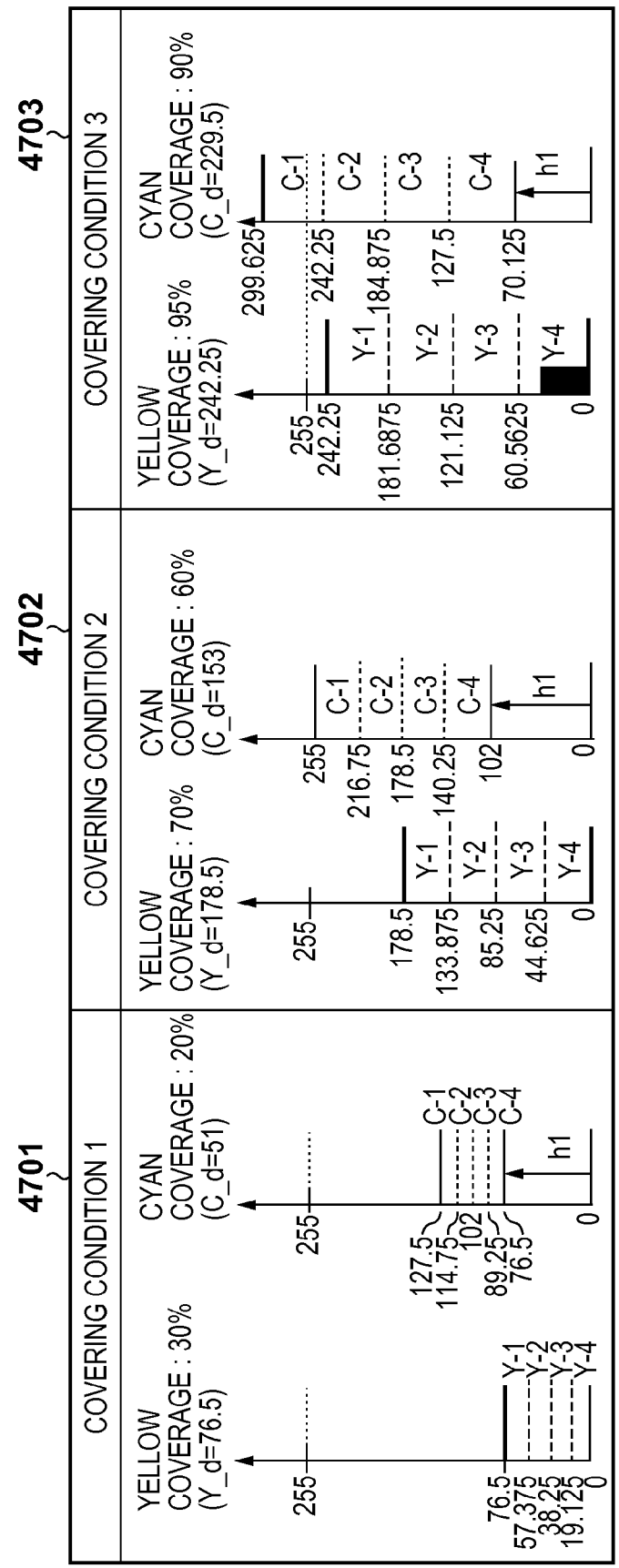
FIG. 20 is a view showing a scanning data range in another embodiment.

The above-described embodiments have described an example in which scanning data of a color to be printed as a lower layer is corrected. Instead, by correcting scanning data of a color to be printed as an upper layer, yellow (Y) can be printed as a lower layer and cyan (C) can be printed as an upper layer. When scanning data of a color to be printed as an upper layer is corrected, scanning numbers are assigned to the ranges of respective scanning data in the order opposite to the above-mentioned one, unlike the above-described embodiments. FIG. 20 shows assignment of scanning numbers when scanning data of a color to be printed as an upper layer is corrected. FIG. 20 shows density ranges set as cyan and yellow scanning data in "covering condition 1" 4701, "covering condition 2" 4702, and "covering condition 3" 4703. As is apparent from FIG. 20, scanning numbers are assigned to the respective scanning data ranges in the order opposite to those in the first to third embodiments (for example, FIG. 11). That is, a larger scanning number is assigned to a lower density range. With this setting, scanning numbers are assigned so that yellow to be printed as a lower layer precedes cyan in halftone image data containing common dots.

Although dot superimposition control is performed for two color components in the above-described embodiments, superimposition control can also be performed for three or more color components.

In the above-described embodiments, the correction amount (for example, h1) of multi-level scanning data is set in accordance with three covering conditions. However, it is unnecessary to classify covering conditions into three and set a correction amount. For example, even if only a correction amount set for "covering condition 1" described above is used, preceding multi-level scanning data can be set for an ink to be printed as a lower layer. For example, when superimposition control is executed using only the setting of h1=C_d for "covering condition 1" in the first embodiment, it is controlled to print cyan as a lower layer and yellow as an upper layer at a high-coverage portion, in contrast to the description of the first embodiment. Even when one or two covering conditions are used, preceding multi-level scanning data can be set. Also, three or more covering conditions can be set.

The above-described embodiments have described an example in which a dot of the second to be printed by a succeeding printing element is printed as a layer lower than a dot of the first color corresponding to a preceding printing element. However, even when a dot to be printed as a lower layer corresponds to a preceding printing element, the same control as that in the above-described embodiments needs to be performed to always print the dot as the lower layer. For example, when the density of the first color corresponding to a preceding printing element is much lower than that of the second color corresponding to a succeeding printing element, most dots of the first color may be printed as a layer on dots of the second color. The above-described embodiments can cope with even this case. That is, the present invention is effective not only for the printhead and scanning direction as shown in FIG. 1B, but also when a color to be printed as a lower layer is controlled in multi-pass printing.

The above-described embodiments have described an example in which the halftone processing unit 109 uses the same threshold matrix for each scanning number and each color. However, the same threshold matrix need not always be used. For example, it is also possible to use the same threshold matrix for each scanning number and different threshold matrices for each color. To the contrary, it is also possible to use different threshold matrices for each scanning number and the same threshold matrix for each color. Further, it is also possible to use different threshold matrices for each color and each scanning number. However, even different threshold matrices desirably form similar dot patterns.

The above-described embodiments have described an example in which an ink to be printed as a lower layer is formed by a preceding scan by controlling multi-level scanning data using the correction amount h1 or the like. However, the gist of the present invention is to set multi-level scanning data in a preceding scan for an ink to be printed as a lower layer. Thus, the scope of the present invention includes setting preceding multi-level scanning data for an ink to be printed as a lower layer even if the correction amount h1 is not used.

In the above-described embodiments, scanning numbers are sequentially assigned to signal value ranges. However, the present invention is not limited to this. For example, covering condition 2 in the first embodiment will be examined. As shown in FIG. 11, scanning numbers are assigned sequentially from a lower range for both cyan and yellow. When the same threshold matrix is used, dots are printed at a common position if cyan and yellow have the same range. To prevent this, a scanning number corresponding to the range of yellow to be printed as a lower layer is assigned to precede a cyan scanning number. It is also possible to assign scanning number 1 to a cyan scanning data range of 76.5 to 121.1, scanning number 2 to a cyan scanning data range of 121.1 to 165.8, scanning number 4 to a cyan scanning data range of 165.8 to 210.4, and scanning number 3 to a cyan scanning data range of 210.4 to 255.

Figure 21:
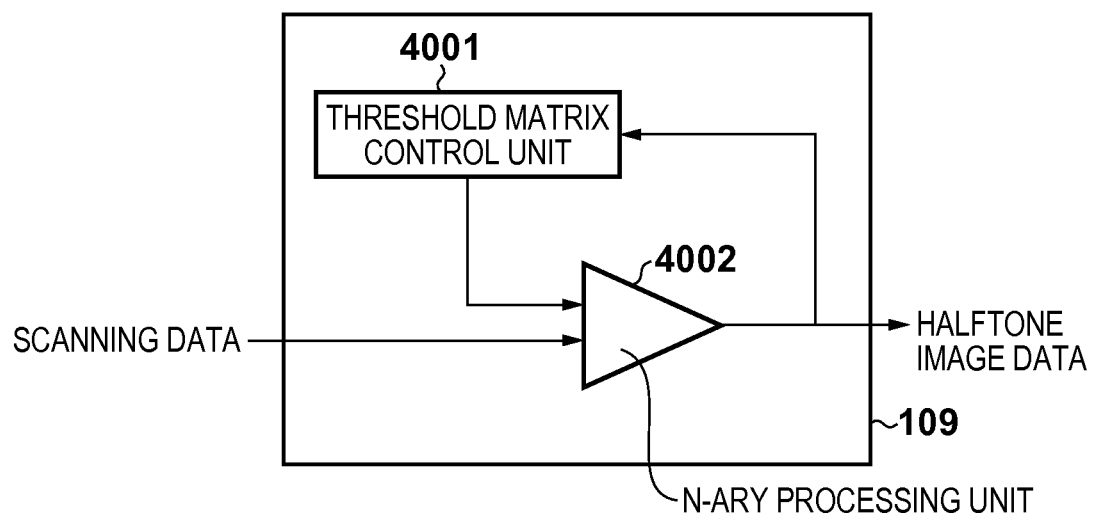
FIG. 21 is a block diagram showing the arrangement of a halftone processing unit in another embodiment.

In the above-described embodiments, an upper signal value and lower signal value in each scan are set in accordance with the signal value and scanning count for each of the first and second image data. However, overlapping in each scan can also be controlled without setting an upper signal value and lower signal value in each scan. When there are halftone image data in which cyan and yellow dots are printed in a common pixel, halftone image data of yellow to be printed as a lower layer is set to correspond to a preceding scanning number. For example, the halftone processing unit 109 may have an arrangement as shown in FIG. 21. A threshold matrix control unit 4001 stores a threshold matrix corresponding to each scan of each color. First, an N-ary processing unit 4002 quantizes each scanning data using a threshold matrix for yellow to be printed as a lower layer. At this time, threshold matrices for respective scans are different in phase, so halftone image data for the respective scans have dot arrangements as exclusive as possible. Then, threshold matrices used for quantization of cyan are controlled based on the yellow halftone image data. In the threshold matrices for the respective scans of cyan, a threshold corresponding to a pixel in which no yellow dot is printed in any scan is set to be low. Also, in the threshold matrices for the respective scans, a threshold corresponding to a pixel in which a yellow dot is printed in a succeeding scan is set to be high. For example, in a threshold matrix corresponding to scanning number 3, thresholds corresponding to pixels in which dots are printed in scans of scanning number 3 and scanning number 4 of yellow are set to be low. In contrast, thresholds corresponding to pixels in which dots are printed in a scan of scanning number 1 and scanning number 2 of yellow are set to be high. By executing this control for threshold matrices corresponding to respective scanning numbers, halftone image data of yellow to be printed as a lower layer is set to correspond to a preceding scanning number when there are halftone image data in which cyan and yellow dots are printed in a common pixel.

The above-described embodiments have been premised on that the printhead 201 as shown in FIG. 1B scans from left to right when forming a plurality of main scanning lines. The printhead arrangement as shown in FIG. 1B always forms a cyan dot in a preceding scan. Thus, if yellow is to be printed as a lower layer, a yellow dot needs to be formed in a scan of a scanning number preceding formation of a cyan dot. However, if the printhead reciprocates, no yellow dot need always be formed in a scan of a scanning number preceding a scan for forming a cyan dot. For example, when the printhead operates from right to left, formation of a yellow dot precedes that of a cyan dot, and a yellow dot is printed as a lower layer. Therefore, the present invention is not limited to the example in which a dot of an ink to be printed as a lower layer is always formed at a preceding scanning number, and scanning data may be set in accordance with the scanning direction, as described above.

The above-described embodiments have described an example in which an image is formed by a so-called inkjet printing method. The present invention is similarly applied to a printing apparatus which forms an image by a method (for example, thermal transfer method or electrophotographic method) other than the inkjet printing method. In this case, a nozzle which discharges an ink droplet in the above-described embodiments corresponds to a printing element or laser emitting element which prints a dot.

The present invention is also applicable to, for example, a so-called full-line printing apparatus which includes a printhead having a length corresponding to the printing width of a printing medium and prints by moving a printing medium with respect to the printhead.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-015929, filed Jan. 27, 2012, which is hereby incorporated by reference herein in its entirety.

What is claimed is:

1. An image processing apparatus which generates image data as a processing target by an image forming apparatus that forms an image by performing a plurality of times a scan in which, in a single region on a printing medium, a printhead including a plurality of printing elements prints in accordance with first image data corresponding to a first color component of an image, and prints in accordance with second image data corresponding to a second color component of the image, comprising:
   a setting unit configured to set first scanning data and second scanning data in each scan for the first image data and the second image data, respectively, by dividing, for respective scans, density ranges represented by pixel values of pixels forming the first image data and the second image data, where each of the first scanning data and the second scanning data includes a lower signal value and an upper signal value of the divided density range; and
   a generating unit configured to generate, in each scan, first halftone image data corresponding to the first color component based on the lower and upper signal values of the first scanning data and a threshold matrix, and second halftone image data corresponding to the second color component based on the lower and upper signal values of the second scanning data and the threshold matrix,
   wherein the setting unit corrects the divided density range for the second image data to reduce an overlapped range between the density range of the first color component and the density range of the second color component in each scan and sets the first scanning data and the second scanning data in each scan for the second color component in accordance with the corrected density range,
   wherein, when there is a common density range between the density range represented by the first scanning data and the density range represented by the second scanning data for respective scans, said setting unit sets the first scanning data as a scan preceding the second scanning data.

2. The apparatus according to claim 1, wherein said setting unit sets the density range of the first scanning data and the density range of the second scanning data to be different from each other between the respective scans, thereby controlling to make the dot patterns including dots at a pixel position common to the dot pattern represented by the first halftone image data and the dot pattern represented by the second halftone image data, correspond to, of the respective scans, a scan in which the first halftone image data precedes the second halftone image data.

3. The apparatus according to claim 1, wherein said setting unit controls to print a dot of the first color component as a layer lower than a dot of the second color component.

4. The apparatus according to claim 1, wherein said setting unit controls to decrease and disperse pixels in each of which a dot of the first color component is printed as a layer on a dot of the second color component.

5. The apparatus according to claim 1,
   wherein said generating unit generates, as halftone image data in each scan for the first image data and the second image data, respectively, differences obtained by performing halftone processing using the threshold matrix for the upper signal values and the lower signal values in each scan, and
   wherein said setting unit sets the lower signal value of the second image data to be larger than the upper signal value of the first image data for each scan.

6. The apparatus according to claim 5, wherein said setting unit adds, to the upper signal value and lower signal value of the second image data in each scan, a correction amount calculated in accordance with division ratios for each scan that are set in advance for the first image data and the second image data, respectively, and signal values of the first image data and second image data.

7. The apparatus according to claim 6, wherein said setting unit sets, as the upper signal values for the first image data and the second image data, respectively, upper limit values of signal value ranges divided for respective scans, sets lower limit values of the signal value ranges as the lower signal values, and then adds the correction amount to the upper signal value and lower signal value of the second image data in each scan.

8. The apparatus according to claim 6, wherein said setting unit sets the upper signal values and the lower signal values by multiplying the first image data and the second image data by a first parameter set for each position of the printing element in the printhead in accordance with the division ratios of the first image data and second image data, and
   wherein said setting unit calculates the correction amount by using a second parameter set for each position of the printing element in the printhead in accordance with the division ratios.

9. The apparatus according to claim 8, wherein each of the first parameter and the second parameter is held as a table.

10. The apparatus according to claim 6, wherein when a first correction determination condition representing that a sum of signal values of the first image data and second image data is smaller than a possible maximum value of each signal value is true, said setting unit sets the signal value of the first image data as the correction amount, wherein when the first correction determination condition is false, and a second correction determination condition representing that a difference parameter serving as a difference between results of multiplying the signal values of the first image data and second image data by the second parameter is not larger than a difference between the maximum value and the signal value of the second image data is true, said setting unit sets, as the correction amount, a value obtained by subtracting the signal value of the second image data from the maximum value, and wherein when the first correction determination condition is false and the second correction determination condition is false, said setting unit sets the difference parameter as the correction amount.

11. The apparatus according to claim 6, wherein the division ratios are set for the respective printing elements in the printhead for the first image data and the second image data, respectively, and are asymmetrically distributed between an upper end and a lower end in the printhead.

12. The apparatus according to claim 11, wherein when the first correction determination condition is false and the second correction determination condition is false, said setting unit sets again the division ratios of the respective printing elements for the first image data in accordance with the second image data, and sets the upper signal values and lower signal values of the first image data and second image data in each scan.

13. The apparatus according to claim 5, wherein said generating unit uses a dispersion matrix as the threshold matrix.

14. The apparatus according to claim 1, wherein the generation unit generates the first and second halftone image data in which a pixel becomes ON when at the position of the pixel the upper signal value is larger than a corresponding threshold in the threshold matrix and the lower signal value is smaller than the corresponding threshold in the threshold matrix, otherwise the pixel becomes OFF.

15. An image processing method in an image processing apparatus which includes a setting unit and a generating unit, and generates image data as a processing target by an image forming apparatus that forms an image by performing a plurality of times a scan in which, in a single region on a printing medium, a printhead including a plurality of printing elements prints in accordance with first image data corresponding to a first color component of an image, and prints in accordance with second image data corresponding to a second color component of the image, comprising the steps of:

setting first scanning data and second scanning data in each scan for the first image data and the second image data, respectively, by dividing, for respective scans, density ranges represented by pixel values of pixels forming the first image data and the second image data, where each of the first scanning data and the second scanning data includes a lower signal value and an upper signal value of the density range assigned; and generating, in each scan, first halftone image data corresponding to the first color component based on the lower and upper signal values of the first scanning data and a threshold matrix, and second halftone image data corresponding to the second color component based on the density ranges of the lower and upper signal values of the second scanning data and the threshold matrix, wherein, in the setting step, the divided density range for the second image data is corrected to reduce an overlapped range between the density range of the first color component and the density range of the second color component in each scan and the second scanning data for the second color component is set in each scan in accordance with the corrected density wherein, when there is a common density range between the density range represented by the first scanning data and the density range represented by the second scanning data for respective scans, said setting step sets the first scanning data as a scan preceding the second scanning data.

16. A non-transitory computer-readable storage medium storing a program for causing a computer apparatus to execute each step of a method defined in claim 15.

17. An image processing apparatus which generates image data as a processing target by an image forming apparatus that forms an image by performing a plurality of times a scan in which, in a single region on a printing medium, a printhead including a plurality of printing elements prints in accordance with first image data corresponding to a first color component of an image, and prints in accordance with second image data corresponding to a second color component of the image, comprising:

a setting unit configured to set first scanning data and second scanning data in each scan for the first image data and the second image data, respectively, by assigning, for respective scans, density ranges obtained by dividing pixel values of pixels forming the first image data and the second image data, wherein each of the first scanning data and second scanning data includes an upper value and a lower value of the assigned density range; and a generating unit configured to generate, in each scan, first halftone image data corresponding to the first color component based on the upper and lower values of the first scanning data and a threshold matrix, and second halftone image data corresponding to the second color component based on the upper and lower values of the second scanning data and the threshold matrix, wherein said setting unit controls an overlapping order of a material corresponding to the first color component and a material corresponding to the second color component by controlling the upper value and the lower value of the second scanning data for each scan.

18. An image processing apparatus which generates image data as a processing target by an image forming apparatus that forms an image by performing a plurality of times a scan in which, in a single region on a printing medium, a printhead including a plurality of printing elements prints in accordance with first image data corresponding to a first color component of an image, and prints in accordance with second image data corresponding to a second color component of the image, comprising:

a correcting unit configured to add a correction amount to the second image data to correct the second image data;

a setting unit configured to set first scanning data and second scanning data in each scan for the first image data and the second image data, respectively, by dividing the density ranges represented by pixel values in the first image data and the second image data to obtain each scanning data of the first and the second image data and assigning a scanning order to the each scanning data so that the density of a preceding scanning data is lower than the density of a subsequent scanning data, where each of the first scanning data and second scanning data includes a lower value and a upper value of the divided density range; and a generating unit configured to generate, in each scan, first halftone image data corresponding to the first color component based on the upper and lower values of the first scanning data and a threshold matrix and second halftone image data corresponding to the second color component based on the density ranges of the first upper and lower values of the second scanning data and the threshold matrix, wherein said correcting unit corrects the second image data so that the density range of the second image data overlaps with a part of the density range of the first image data.

19. An image processing apparatus which generates image data as a processing target by an image forming apparatus that forms an image by performing a plurality of times a scan in which, in a single region on a printing medium, a printhead including a plurality of printing elements prints in accordance with first image data corresponding to a first color component of an image, and prints in accordance with second image data corresponding to a second color component of the image, comprising:

a correcting unit configured to add a correction amount to the second image data to correct the second image data;

a setting unit configured to set first scanning data and second scanning data in each scan for the first image data and the second image data, respectively, by dividing the density ranges represented by pixel values in the first image data and the second image data to obtain each scanning data of the first and the second image data, where each of the first scanning data and the second scanning data includes a lower value and an upper value of the divided density range; and a generating unit configured to generate, in each scan, first halftone image data corresponding to the first color component based on the lower and upper values of the first scanning data and a threshold matrix and second halftone image data corresponding to the second color component based on the lower and upper values of the second scanning data and the threshold matrix, wherein said correcting unit corrects the second image data using selectively either a first correction amount or a second correction amount to be added to the second image data, where the first correction amount is used not for overlapping the density ranges of the first image data and the second image data each other and the second correction amount is used to overlap the density ranges of the first image data and the second image data each other.

20. An image processing method in an image processing apparatus which includes a setting unit and a generating unit, and generates image data as a processing target by an image forming apparatus that forms an image by performing a plurality of times a scan in which, in a single region on a printing medium, a printhead including a plurality of printing elements prints in accordance with first image data corresponding to a first color component of an image, and prints in accordance with second image data corresponding to a second color component of the image, comprising the steps of:

setting first scanning data and second scanning data in each scan for the first image data and the second image data, respectively, by assigning, for respective scans, density ranges obtained by dividing pixel values of pixels forming the first image data and the second image data, wherein each of the first scanning data and second scanning data includes an upper value and a lower value of the assigned density range; and generating, in each scan, first halftone image data corresponding to the first color component based on the upper and lower values of the first scanning data and a threshold matrix and second halftone image data corresponding to the second color component based on the upper and lower values of the second scanning data and the threshold matrix, wherein said setting step controls an overlapping order of a material corresponding to the first color component and a material corresponding to the second color component by controlling the upper and lower values of the second scanning data for each scan.

21. An image processing method in an image processing apparatus which includes a setting unit and a generating unit, and generates image data as a processing target by an image forming apparatus that forms an image by performing a plurality of times a scan in which, in a single region on a printing medium, a printhead including a plurality of printing elements prints in accordance with first image data corresponding to a first color component of an image, and prints in accordance with second image data corresponding to a second color component of the image, comprising the steps of:

adding a correction amount to the second image data to correct the second image data;

setting first scanning data and second scanning data in each scan for the first image data and the second image data, respectively, by dividing, for respective scans, density ranges represented by pixel values of pixels forming the first image data and the second image data and assigning a scanning order to each scanning data so that the density of a preceding scanning data is lower than the density of a subsequent scanning data, where each of the first scanning data and the second scanning data includes a lower value and an upper value of the divided density range; and generating, in each scan, first halftone image data corresponding to the first color components based on the lower and upper values of the first scanning data and a threshold matrix and second halftone image data corresponding to the second color component based on the lower and upper values of the second scanning data and the threshold matrix, wherein said adding step corrects the second image data so that the density range of the second image data overlaps with a part of the density range of the first image data.

22. An image processing method in an image processing apparatus which includes a setting unit and a generating unit, and generates image data as a processing target by an image forming apparatus that forms an image by performing a plurality of times a scan in which, in a single region on a printing medium, a printhead including a plurality of printing elements prints in accordance with first image data corresponding to a first color component of an image, and prints in accordance with second image data corresponding to a second color component of the image, comprising the steps of:

adding a correction amount to the second image data to correct the second image data;

setting first scanning data and second scanning data in each scan for the first image data and the second image data, respectively, by dividing, for respective scans, density ranges represented by pixel values of pixels forming the first image data and the second image data, where each of the first scanning data and the second scanning data includes a lower value and an upper value of the divided density range; and generating, in each scan, first halftone image data corresponding to the first color component based on the lower and upper values of the first scanning data and a threshold matrix and second halftone image data corresponding to the second color component based on the lower and upper values of the second scanning data and the threshold matrix, wherein said adding step corrects the second image data using selectively either a first correction amount or a second correction amount to be added to the second image data, where the first correction amount is used to not overlap the density ranges of the first image data and the second image data with each other and the second correction amount is used to overlap the density ranges of the first image data and the second image data with each other.

* * * * *